(12) United States Patent
Nagai et al.

(10) Patent No.: US 10,730,566 B2
(45) Date of Patent: Aug. 4, 2020

(54) VEHICLE

(71) Applicant: YAMAHA MOTOR POWER PRODUCTS KABUSHIKI KAISHA, Kakegawa-shi, Shizuoka (JP)

(72) Inventors: Takayuki Nagai, Shizuoka (JP); Yoshiki Tonooka, Shizuoka (JP); Masayuki Kawamura, Shizuoka (JP)

(73) Assignee: YAMAHA MOTOR POWER PRODUCTS KABUSHIKI KAISHA, Shizuoka (JP)

( * ) Notice: Subject to any disclaimer, the term of this patent is extended or adjusted under 35 U.S.C. 154(b) by 25 days.

(21) Appl. No.: 16/092,368

(22) PCT Filed: Jun. 1, 2017

(86) PCT No.: PCT/JP2017/020506
§ 371 (c)(1),
(2) Date: Oct. 9, 2018

(87) PCT Pub. No.: WO2018/008305
PCT Pub. Date: Jan. 11, 2018

(65) Prior Publication Data
US 2019/0126992 A1    May 2, 2019

(30) Foreign Application Priority Data
Jul. 8, 2016   (JP) .................................. 2016-136458

(51) Int. Cl.
*B62D 25/20*   (2006.01)
*B62D 21/05*   (2006.01)
(Continued)

(52) U.S. Cl.
CPC ............. *B62D 25/20* (2013.01); *B62D 21/05* (2013.01); *B62D 23/005* (2013.01);
(Continued)

(58) Field of Classification Search
CPC .. B62D 25/082; B62D 25/20; B62D 25/2018; B62D 25/2027; B62D 25/2072; B62D 35/02; B60R 13/0861
(Continued)

(56) References Cited

U.S. PATENT DOCUMENTS

| | | | |
|---|---|---|---|
| 4,326,445 A | 4/1982 | Bemiss | |
| 5,321,214 A * | 6/1994 | Uegane | B60K 13/04 181/211 |

(Continued)

FOREIGN PATENT DOCUMENTS

| | | |
|---|---|---|
| DE | 195 34 972 A1 | 3/1997 |
| DE | 10 2012 022 108 A1 | 5/2013 |

(Continued)

OTHER PUBLICATIONS

English translation of JP 6133663; retreived via PatentTranslate located at www.epo.org. (Year: 2019).*

(Continued)

*Primary Examiner* — Jason S Daniels
(74) *Attorney, Agent, or Firm* — Keating and Bennett, LLP

(57) ABSTRACT

A golf car includes a frame including main frames and cross members, an undercover that includes a front cover and a rear cover and is supported by the frame, and an engine room including an underside defined by the undercover. The front cover includes a rear end region provided with pawls. The rear cover includes a front end region provided with pawls. All of the pawls are engaged with the cross member. The front cover is fixed to the cross member and the main frames with fasteners, and the rear cover includes a rear end region fixed to the main frames with fasteners. The front cover and the rear cover include water drainage holes.

9 Claims, 24 Drawing Sheets

(51) Int. Cl.
   *B62D 23/00* (2006.01)
   *B62D 25/08* (2006.01)
   *B62D 25/24* (2006.01)

(52) U.S. Cl.
   CPC ....... *B62D 25/082* (2013.01); *B62D 25/2018* (2013.01); *B62D 25/2027* (2013.01); *B62D 25/2072* (2013.01); *B62D 25/24* (2013.01)

(58) Field of Classification Search
   USPC .................... 296/38, 187.08, 193.07, 199
   See application file for complete search history.

(56) References Cited

U.S. PATENT DOCUMENTS 7,815,250 B2 * 10/2010 Oshio ................... B60K 13/04
                                                                                                    296/204
   2002/0195842 A1   12/2002 Kruschhausen et al.
   2009/0302590 A1   12/2009 Van Bronkhorst et al.
   2015/0122573 A1    5/2015 Yamamoto et al.
   2018/0057069 A1 *  3/2018 Kayadere ............... B21D 53/88

FOREIGN PATENT DOCUMENTS

| | | |
|---|---|---|
| JP | 53-127419 U | 10/1978 |
| JP | 07-81440 A | 3/1995 |
| JP | 11-78993 A | 3/1999 |
| JP | 11-348833 A | 12/1999 |
| JP | 2002-366160 A | 12/2002 |
| JP | 2005-007995 A | 1/2005 |
| JP | 2007-001419 A | 1/2007 |
| JP | 2010-095105 A | 4/2010 |
| JP | 6133663 B2 * | 5/2017 |

OTHER PUBLICATIONS

Official Communication issued in International Patent Application No. PCT/JP2017/020506, dated Jun. 27, 2017.

Yamamoto et al, "Vehicle", U.S. Appl. No. 16/092,367, filed Oct. 9, 2018.

Oba et al., "Vehicle", U.S. Appl. No. 16/092,370, filed Oct. 9, 2018.

* cited by examiner

F I G. 1
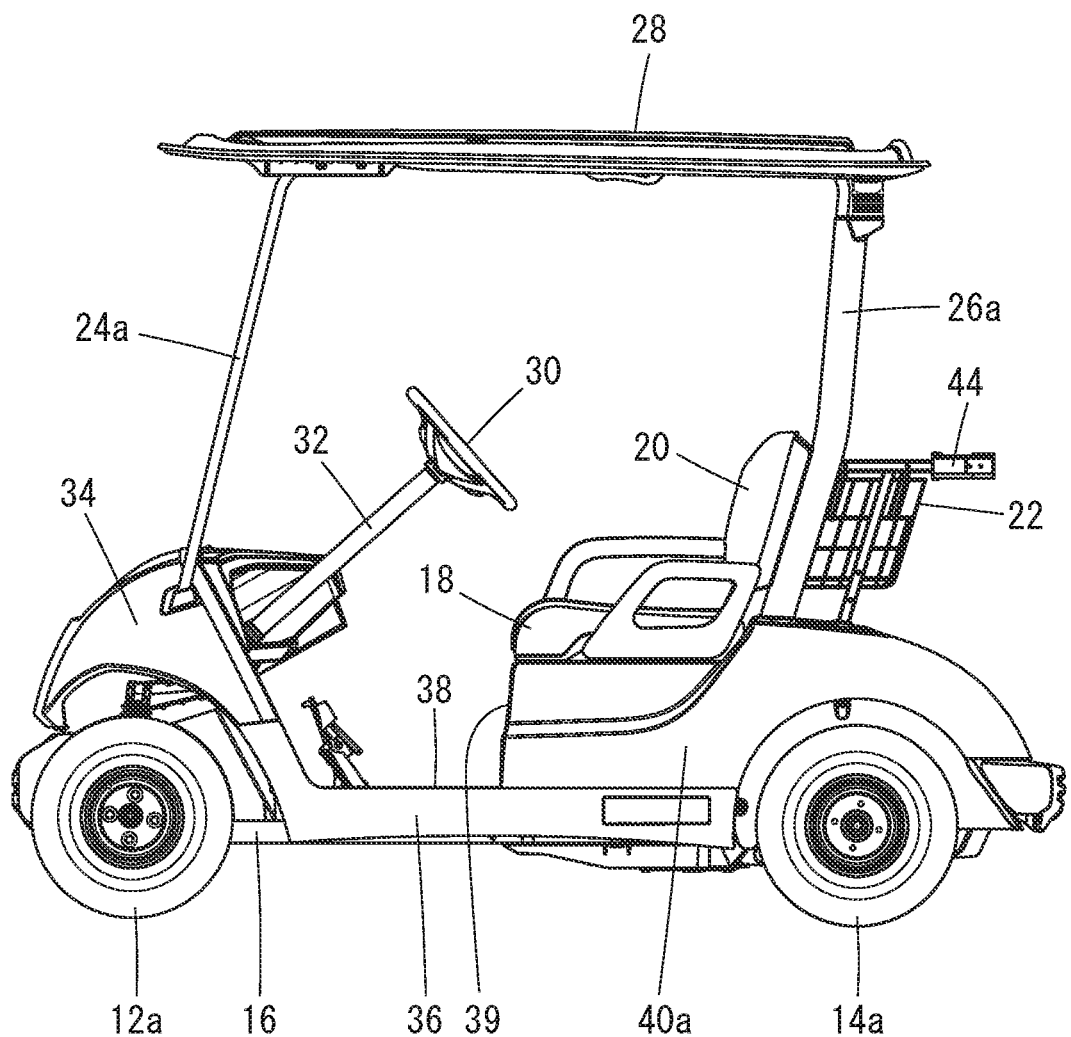

VEHICLE

BACKGROUND OF THE INVENTION

1. Field of the Invention

The present invention relates to vehicles, and more specifically to a vehicle including an engine.

2. Description of the Related Art

JP-A 2010-95105 discloses an example of a conventional technique in this field. JP-A 2010-95105 discloses a multi-purpose vehicle which includes an engine mounted on a traveling vehicle body, a transmission case which transmits rotation from the engine to traveling wheels, an operation steering wheel, a driver's seat and a cargo bed disposed behind the driver's seat. The engine and the transmission case are housed inside an engine room of a sealed structure disposed below the cargo bed. In this vehicle, the engine room is composed of a front box portion and a rear box portion. A bottom frame plate provides a bottom surface of the front box portion, while a bottom cover plate provides a bottom surface of the rear box portion.

In FIG. 3 of JP-A 2010-95105, the bottom frame plate provides the bottom surface of the front box portion, supports an approximate center bottom portion of the traveling vehicle body, and is integral with a rear frame, whereas the bottom cover plate is supported by the rear frame and is integral with a lower end region of the rear box portion. Therefore, it is not easy to attach/detach the bottom frame plate nor the bottom cover plate, and it is difficult to absorb impacts from below.

SUMMARY OF THE INVENTION

Preferred embodiments of the present invention provide vehicles each including an undercover which is easy to attach/detach and that is able to absorb impacts from below.

According to a preferred embodiment of the present invention, a vehicle includes a frame that includes a pair of main frames spaced apart from each other in a vehicle width direction and extending in a vehicle fore-aft direction, and first, second, and third cross members each extending in the vehicle width direction to join the pair of main frames to each other; an undercover supported by the frame and including a front cover and a rear cover respectively provided on a forward side and a rearward side of the undercover; an engine room including an underside defined by the undercover; and an engine housed in the engine room. The first, the second, and the third cross members are spaced apart from each other in the vehicle fore-aft direction and are disposed in this order from a front to a rear of the vehicle. The rear end region of the front cover and the front end region of the rear cover are respectively engaged with the second cross member, the front cover is fixed to at least one of the first cross member and the pair of main frames, and the rear cover is fixed to at least one of the third cross member and the pair of main frames.

In a preferred embodiment of the present invention, the rear end region of the front cover and the front end region of the rear cover are respectively engaged with the second cross member; thereafter, the front cover is fixed to at least one of the first cross member and the pair of main frames, and the rear cover is fixed to at least one of the third cross member and the pair of main frames to complete the process. Therefore, it is easy to assemble the front cover and the rear cover to the frame. On the other hand, the rear end region of the front cover and the front end region of the rear cover are simply engaged with the second cross member, and therefore, when disassembling, it is only required to detach the front cover from the first cross member and/or the pair of main frames, and detach the rear cover from the third cross member and/or the pair of main frames. Then the front cover and the rear cover are easily removed from the frame. As described, it is possible to easily attach/detach the undercover. Also, since the rear end region of the front cover and the front end region of the rear cover are simply engaged with the second cross member, in a case of an impact from below, the rear end region of the front cover and the front end region of the rear cover are moved upward, such that it is possible to absorb the impact. As described above, the undercover is able to absorb impacts from below, and reduce damage or the like to the undercover.

Preferably, the front cover includes a water drainage hole, and the rear cover includes a water drainage hole. In this case, even if water comes inside the engine room, it is easy to discharge water from the holes in the front cover and/or the rear cover out of the engine room.

Further preferably, the front cover also defines the underside of the engine room. In this case, access to the engine room from below is provided by simply removing the front cover. This makes it easy to perform activities such as maintenance procedures inside the engine room.

Further, preferably, the engine room further houses a muffler to which exhaust gas from the engine is supplied, a muffler cover that covers the muffler, and an exhaust duct connected to an exit end portion of the muffler cover; and the front cover includes an opening to which the exhaust duct is attached. In this case, exhaust gas from the muffler passes through the exhaust duct which is connected to the exit end portion of the muffler cover and the opening in the front cover, and then to the outside from below the engine room. During this process, noise from the muffler is attenuated inside the exhaust duct. Also, since the exhaust duct is connected to the muffler cover, noises propagating through the muffler cover, such as vibration noise of the engine, are attenuated inside the exhaust duct. Therefore, it is possible to reduce noise leakage to the outside the vehicle.

Preferably, the opening is located at a more rearward position than a center of the front cover in the fore-aft direction. In this case, the exhaust duct is attached to the opening which is located at a more rearward position than the center of the front cover in the fore-aft direction. This makes it easy to perform activities such as maintenance procedures inside the engine room. In other words, when the front cover is detached from the first cross member and/or the pair of main frames; and the front end region of the front cover is moved downward to open the front cover while the rear end region of the front cover is engaged with the second cross member, an amount of positional change of the front cover is smaller in its rear region than in its front region. Since the opening is located at a more rearward position than the center of the front cover in the fore-aft direction, a change in the position of the opening is small if the front cover is opened slightly. Thus, there is no need to remove the exhaust duct from the opening if maintenance procedures are performed in this state.

Further preferably, the opening is located at a more rearward position than the muffler cover in a side view. In this case, since the opening in the front cover is not beneath the muffler cover, but is located at a more rearward position than the muffler cover in a side view, it is possible to extend the exhaust duct rearward to make the exhaust duct relatively long. Therefore, it is possible to discharge the exhaust gas from below the engine room toward the rear. Further, this further attenuates the noises from the muffler and the muffler cover inside the exhaust duct, making it possible to further reduce the noise leakage to the outside of the vehicle.

Further, preferably, the vehicle further includes a fastener which fixes the front cover to at least one of the first cross member and the pair of main frames, and a fastener which fixes the rear cover to at least one of the third cross member and the pair of main frames. With this structure, the rear end region of the front cover and the front end region of the rear cover include pawls which are engaged with the second cross member. In this case, the rear end region of the front cover and the front end region of the rear cover are engaged with the second cross member with their respective pawls, and thereafter, the front cover is fixed to at least one of the first cross member and the pair of main frames with the fastener, while the rear cover is fixed to at least one of the third cross member and the pair of main frames with the fastener, such that it is easy to assemble the front cover and the rear cover to the frame. When disassembling, on the other hand, simple removal of the fastener, which fixes the front cover to at least one of the first cross member and the pair of main frames; and the fastener, which fixes the rear cover to at least one of the third cross member and the pair of main frames, makes it possible to remove the front cover and the rear cover easily from the frame.

Preferably, the front end region of the front cover and the rear end region of the rear cover include pawls which are respectively engaged with the first cross member and the third cross member. In this case, the rear end region of the front cover and the front end region of the rear cover are engaged with the second cross member with their respective pawls; and thereafter the front end region of the front cover and the rear end region of the rear cover are engaged with the first cross member and the third cross member respectively with their pawls, such that it becomes even easier to fix the front cover and the rear cover to the frame with the fasteners.

According to preferred embodiments of the present invention, vehicles each include an undercover which is easy to attach/detach and is able to absorb impacts from below.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1 is a side view (taken from left) showing a golf car according to a preferred embodiment of the present invention.

FIG. 8 is a rear perspective view showing the frame, a floor panel, and so on.

FIG. 9 is a plan view showing the frame, the floor panel, and so on.

FIG. 15 is a side view (taken from left) showing the frame, the floor panel, and so on.

DETAILED DESCRIPTION OF THE PREFERRED EMBODIMENTS

Hereinafter, preferred embodiments of the present invention will be described with reference to the drawings. Herein, description will be made in which a preferred embodiment of the present invention is applied to a golf car 10 as an example of a vehicle. It is noted that the terms front and rear, right and left, up and down as used in the following description are determined from the golf car driver's position on a seat 18 of the golf car 10, with the driver facing toward a steering wheel 30.

Figure 2:
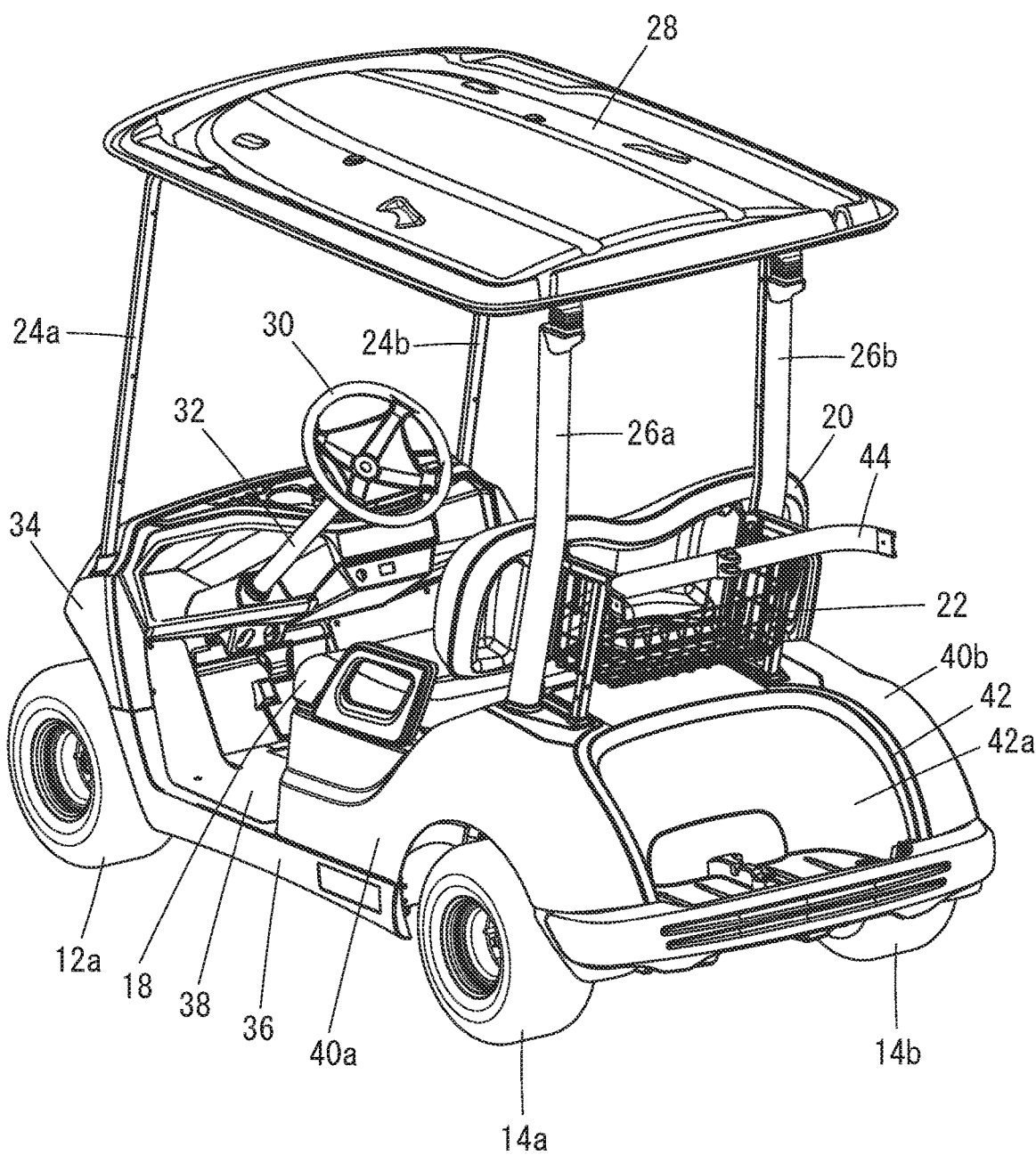
FIG. 2 is a rear perspective view showing the golf car according to a preferred embodiment of the present invention.
Figure 3:
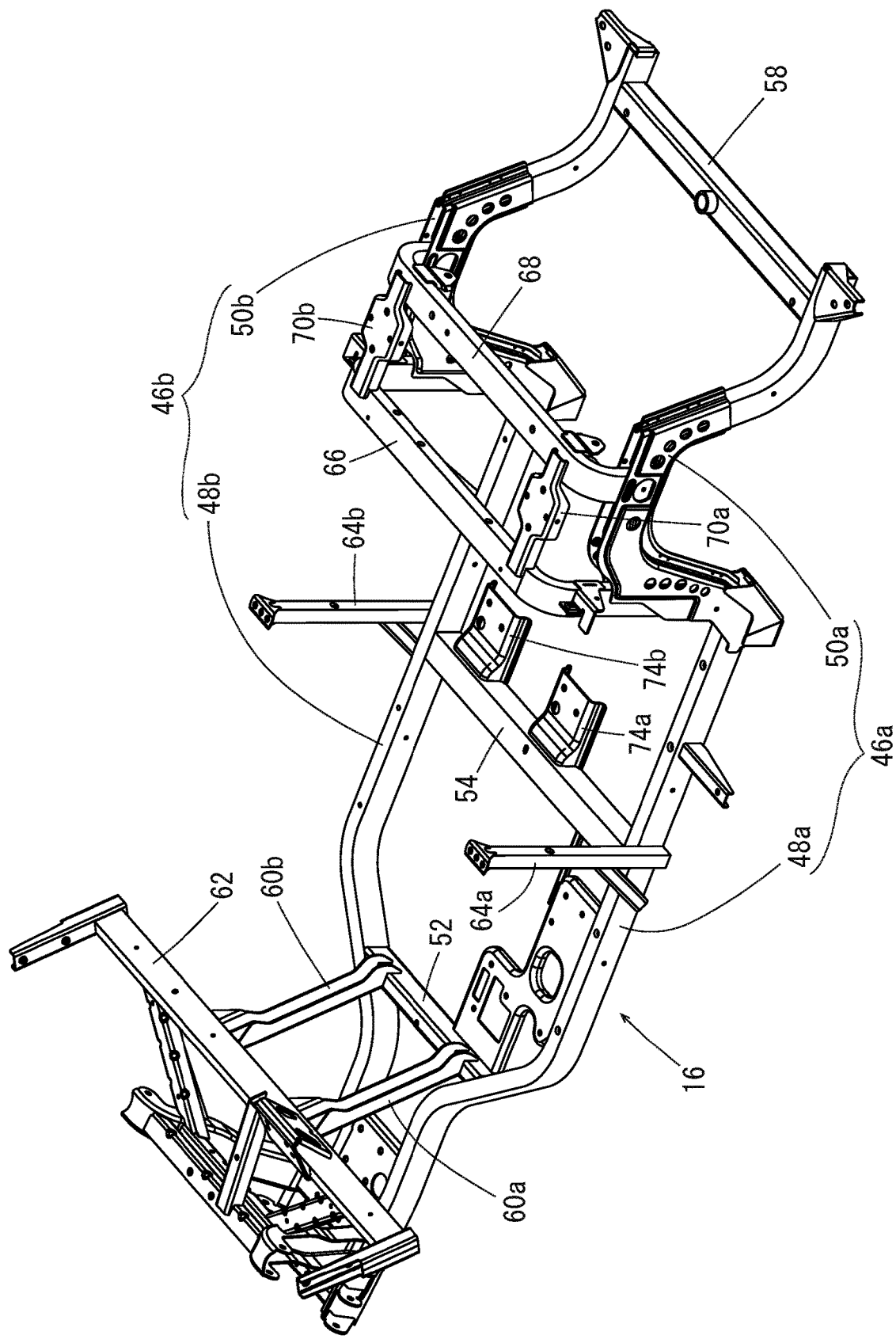
FIG. 3 is a rear perspective view showing a primary portion of a frame.

Referring to FIG. 1 and FIG. 2, the golf car 10 is, for example, a two-person golf car, and includes a pair of front wheels 12a, 12b (see FIG. 9), a pair of rear wheels 14a, 14b, and a frame 16. The pair of rear wheels 14a, 14b are located more rearward than the pair of front wheels 12a, 12b. The pair of front wheels 12a, 12b are supported rotatably at a front region of the frame 16. The pair of rear wheels 14a, 14b are supported rotatably at a rear region of the frame 16.

The seat 18 extends in a width direction of the golf car 10 at a more rearward position than the pair of front wheels 12a, 12b, but at a more forward position than the pair of rear wheels 14a, 14b. The seat 18 is supported by a seat rail 72 (which will be described below) of the frame 16. A seat back 20 is provided at an obliquely upward and rearward position of the seat 18. A basket 22 that accommodates baggage is provided behind the seat back 20. The seat back 20 and the basket 22 are supported by rear pillars 26a, 26b which will be described below.

A pair of front pillars 24a, 24b are provided at more forward positions than the seat 18, whereas a pair of rear pillars 26a, 26b are provided at more rearward positions than the seat 18. The front pillars 24a, 24b and the rear pillars 26a, 26b are supported by the frame 16 at their lower end portions. The front pillars 24a, 24b and the rear pillars 26a, 26b extend from below to above, while tilting slightly rearward. A roof 28 covers from above the seat 18, and is supported by the front pillars 24a, 24b and the rear pillars 26a, 26b.

A steering wheel 30 is located ahead of the seat back 20. The steering wheel 30 is connected to the front wheels 12a, 12b via a steering shaft 32 and an unillustrated connection mechanism.

The frame 16 is covered with a cowl 34, a pair of side protectors 36, a floor panel 38, a body panel 39, a pair of rear fender covers 40a, 40b, and a rear floor cover 42, each made of a resin for example. The cowl 34 covers the front region of the frame 16 and above the front wheels 12a, 12b. The pair of side protectors 36 cover an intermediate region of the frame 16 from two sides. The floor panel 38, which defines and functions as a footrest for the driver and the passenger sitting on the seat 18 to rest their feet, provides a bottom portion of a cabin space of the golf car 10. The body panel 39 covers a front region below the seat 18. The pair of rear fender covers 40a, 40b cover two sides below the seat 18 and above the pair of rear wheels 14a, 14b. The rear floor cover 42 is sandwiched by rear end portions of the pair of rear fender covers 40a, 40b, and includes a concave portion 42a to place golf bags, for example. Simply by removing the rear floor cover 42 only, it is possible to easily maintain a CVT (Continuously Variable Transmission) 144 (which will be described below) and a transmission 146 (which will be described below). At a position above the concave portion 42a and behind the basket 22, there is provided a holder 44 that holds the golf bags. The holder 44 is supported by connectors 70a, 70b (which will be described below).

Next, a structure of the frame 16 and its surroundings will be described.

Referring to FIG. 3 through FIG. 7, the frame 16 includes a pair of main frames 46a, 46b which are spaced apart from each other in a width direction of the vehicle and extend in a fore-aft direction of the vehicle; cross members 52, 54, 56, 58, and a pair of support frames 60a, 60b. The pair of main frames 46a, 46b respectively include front frames 48a, 48b extending in the fore-aft direction; and rear frames 50a, 50b extending rearward from rear end portions of the respective front frames 48a, 48b. The pair of front frames 48a, 48b are provided so that their front end portions are closer to each other than their rear end portions do. The pair of rear frames 50a, 50b are curved to project upward.

The front frames 48a, 48b are connected to each other by the cross members 52, 54. A portion where the front frame 48a and the rear frame 50a are joined to each other and a portion where the front frame 48b and the rear frame 50b are joined to each other are connected to each other by the cross member 56. The rear frames 50a, 50b have their rear end portions connected to each other by the cross member 58. In other words, the main frames 46a, 46b are connected to each other by the cross members 52, 54, 56, 58 which extend in the vehicle width direction. The cross members 52, 54, 56, 58 are spaced apart from each other in the vehicle fore-aft direction, and are disposed in this order from the front to the rear of the vehicle. The cross member 52 is joined to the pair of support frames 60a, 60b which extend obliquely forward. The cross members 54, 56, 58 represent the first, the second, and the third cross members respectively.

The pair of support frames 60a, 60b have their front end portions support a cross member 62 which extends in the vehicle width direction. Near the cross member 54 in the pair of front frames 48a, 48b, a pair of support frames 64a, 64b which extend upward are joined. Also, the pair of rear frames 50a, 50b have their front portions connected to each other by a connection frame 66. The pair of rear frames 50a, 50b have their intermediate regions connected to each other by a connection frame 68. The connection frame 66 extends in the vehicle width direction, with its two end portions extending downward to define an upwardly projecting U-shape. The connection frame 68 extends in the vehicle width direction, with its two end portions extending downward to define an upwardly projecting U-shape. The connection frames 66 and 68 are spaced apart from each other in the vehicle fore-aft direction, and are connected to each other by the connectors 70a, 70b. Further, the pair of support frames 64a, 64b include their upper end portions; the connection frame 66 include two side portions; and these portions are connected to each other by the seat rail 72. The seat rail 72 is C-shaped or substantially C-shaped and extend in a horizontal direction. To the cross member 54, a pair of brackets 74a, 74b are attached side by side in the vehicle width direction.

Figure 4:
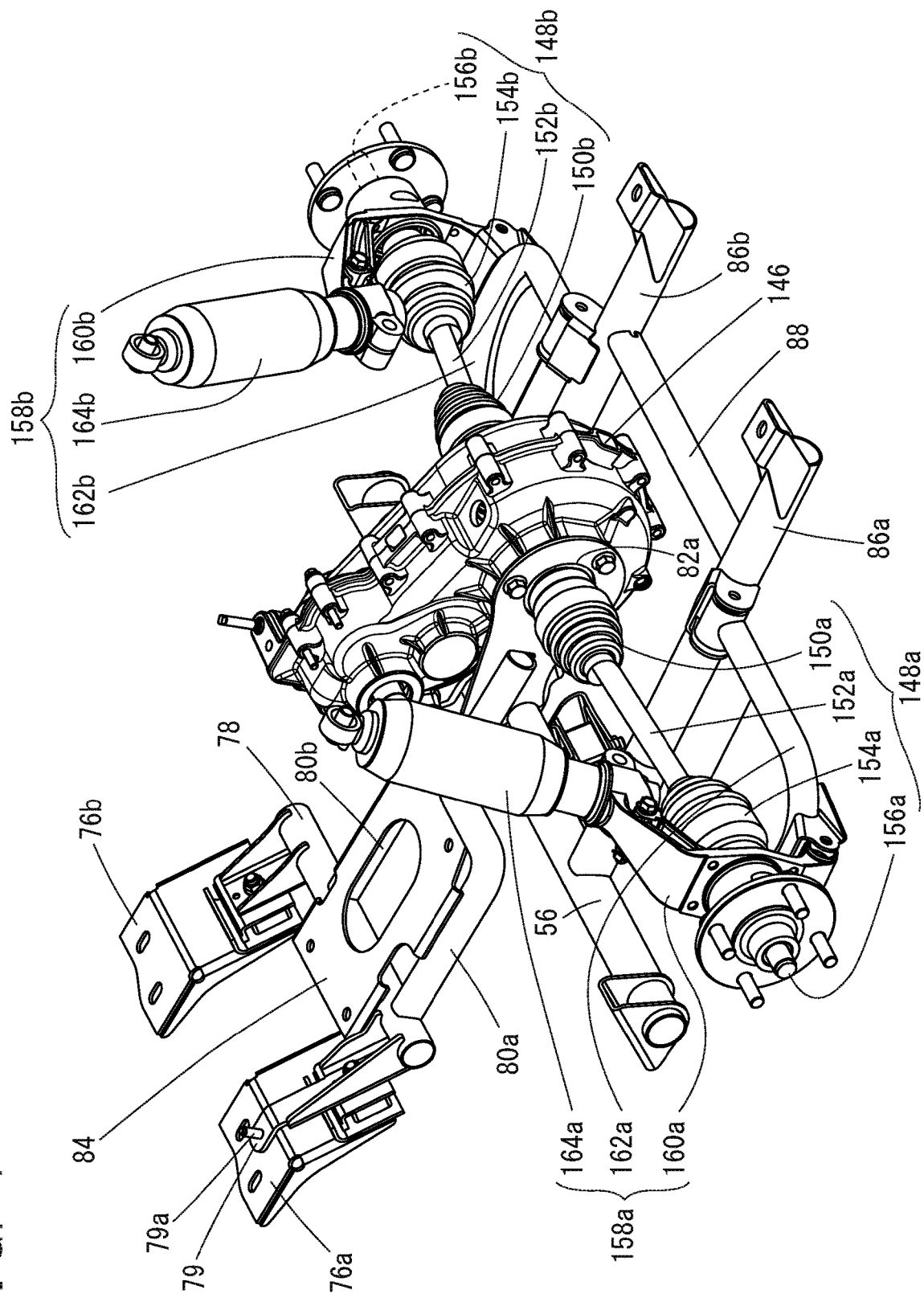
FIG. 4 is a rear perspective view showing a portion of the frame, a transmission, and their surroundings.
Figure 5:
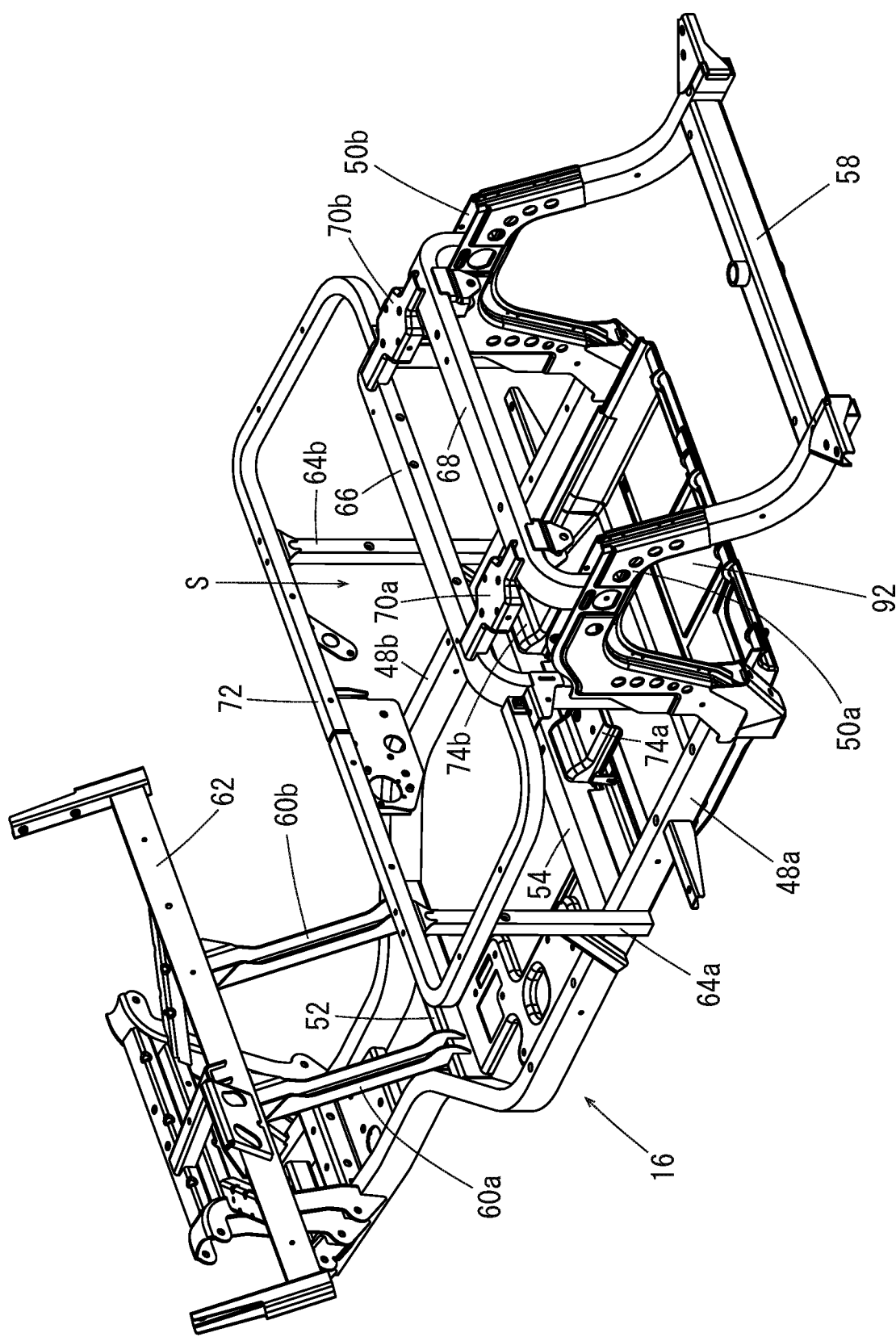
FIG. 5 is a rear perspective view showing a primary portion of the frame and a front cover.

Referring to FIG. 4, a pair of engine brackets 76a, 76b are joined to the pair of brackets 74a, 74b. The engine brackets 76a, 76b are connected to each other via a cross member 78. The cross member 78 is joined to a support frame 79 which extends forward and support frames 80a, 80b which extend rearward. The support frame 79 includes a tip portion including a projection 79a. The support frames 80a, 80b have their respective rear end portions provided with through-holes 82a, 82b (see FIG. 8). On the cross member 78 and the support frames 80a, 80b, there is attached an engine bracket 84 to support an engine 114 (which will be described below). The cross member 78 is pivotably joined to the engine brackets 76a, 76b in an up-down direction. Accordingly, the engine bracket 84 is also pivotable in the up-down direction. The cross member 56 is joined to a pair of frames 86a, 86b which extend rearward. The pair of frames 86a, 86b are connected to each other at regions near their rear end portions by a cross member 88. The pair of frames 86a, 86b have their rear end portions joined to the cross member 58.

Figure 6:
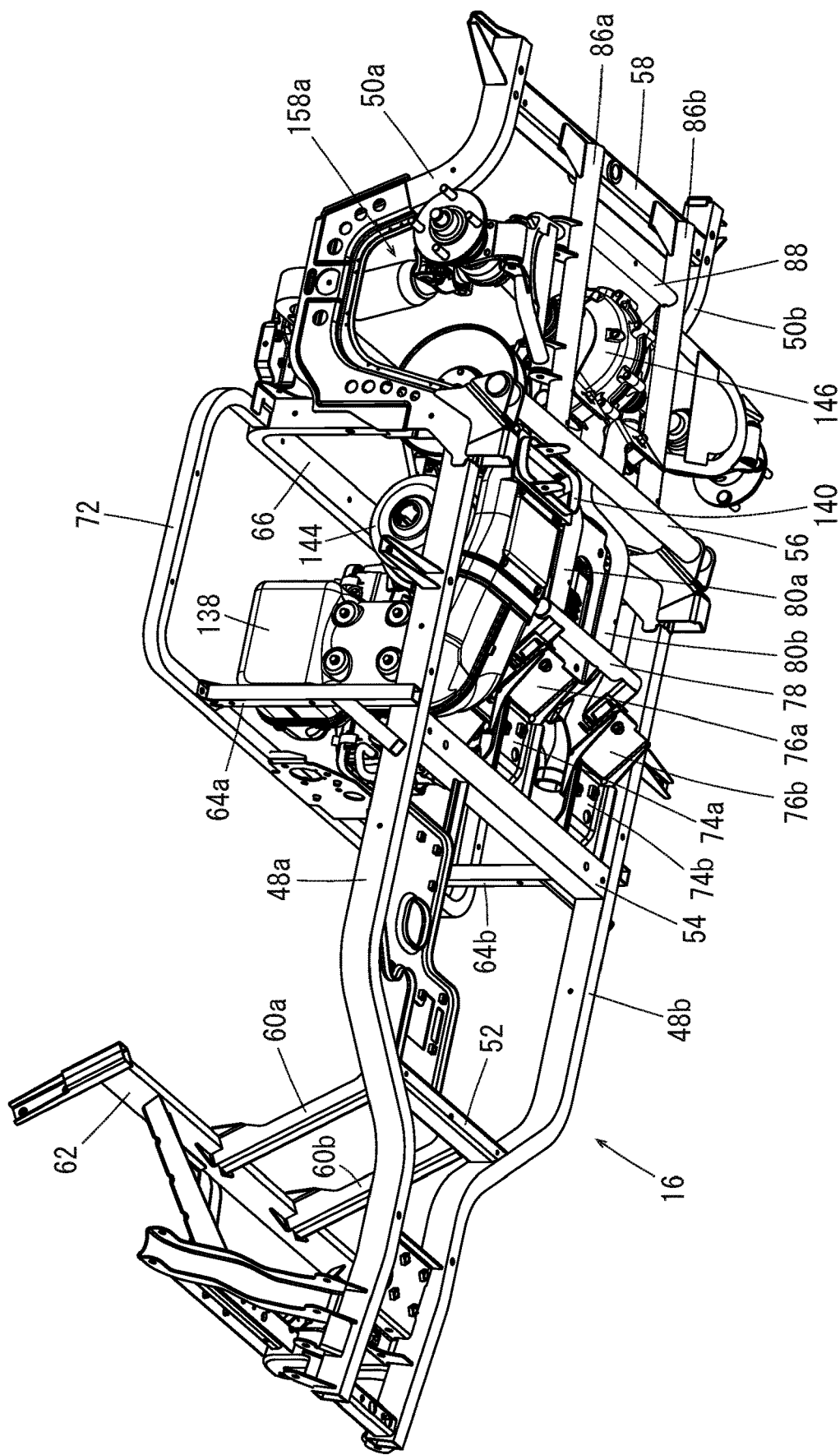
FIG. 6 is a perspective view showing the frame and its surroundings.
Figure 7:
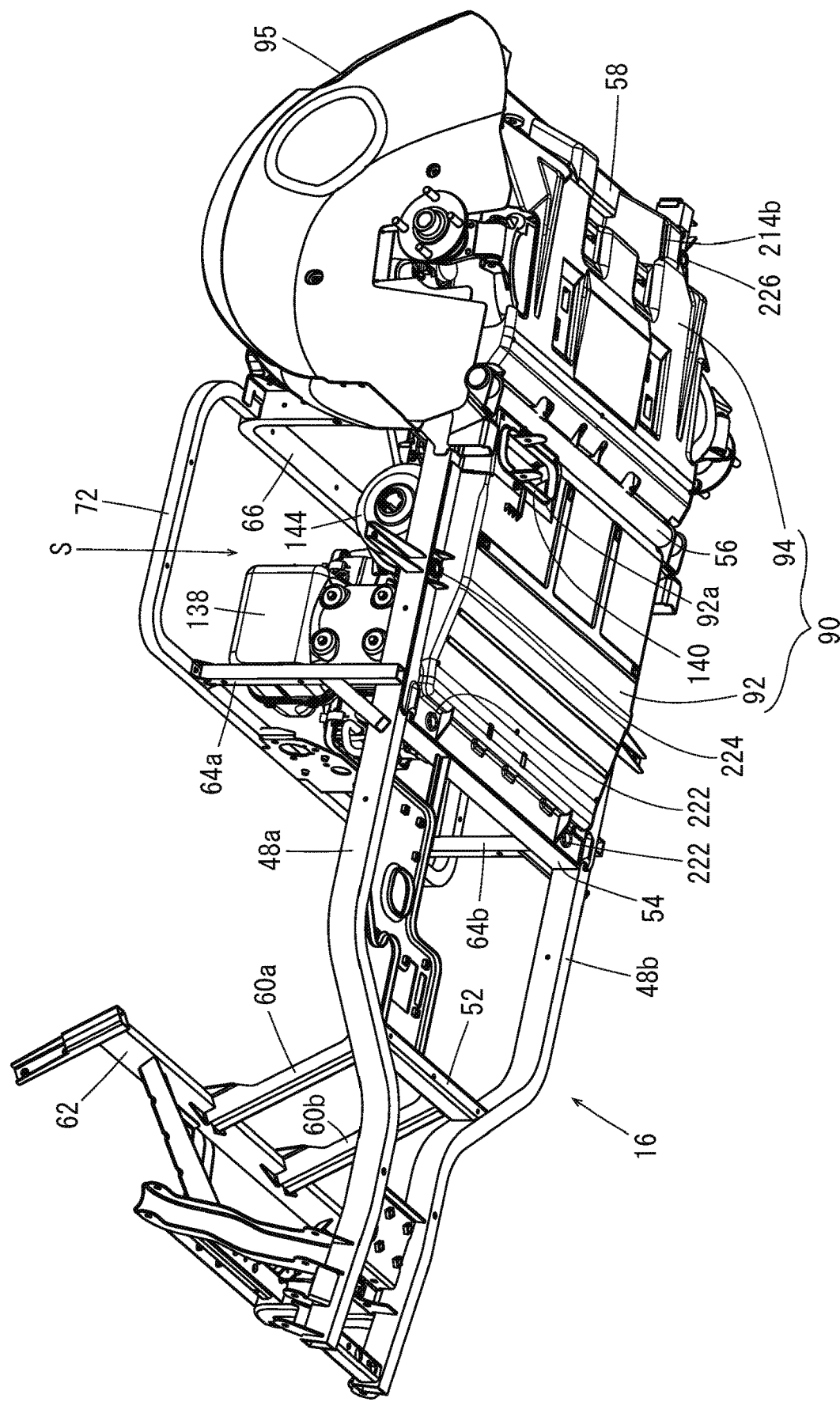
FIG. 7 is a perspective view showing the frame, an undercover, and their surroundings.

Referring to FIG. 6 and FIG. 7, the frame 16 supports an undercover 90. The undercover 90 includes a front cover 92 and a rear cover 94 respectively on its forward and rearward sides. The front cover 92 is located between the cross members 54 and 56, and is attached to the pair of front frames 48a and 48b, and to the cross members 54 and 56. The rear cover 94 is located between the cross members 56 and 58, and is attached to the cross members 56 and 88, the frames 86a, 86b, and the rear frames 50a, 50b. To the rear frames 50a, 50b, a pair of inner cowls 95 (the inner cowl on the right side is not shown) are attached respectively. The pair of inner cowls 95 are located between the rear wheels 14a, 14b and the rear fender covers 40a, 40b to cover above the respective rear wheels 14a, 14b. The front cover 92 and the rear cover 94 of the undercover 90 will be described below.

The undercover 90, the seat 18, the body panel 39, a heat insulation board 176 (which will be described below), a fuel tank 168 (which will be described below), the left and the right inner cowls 95, and the rear floor cover 42 define a space as an engine room S. In other words, the engine room S is surrounded by the undercover 90, the seat 18, the body panel 39, the heat insulation board 176, the fuel tank 168, the left and the right inner cowls 95, and the rear floor cover 42. In other words, on an under side, an upper side, a front side, a left side, a right side, and a rear side of the engine room S, there are provided the undercover 90, the seat 18, the body panel 39, the heat insulation board 176 and the left inner cowl 95, the fuel tank 168 and the right inner cowl 95, and the rear floor cover 42, respectively. The undercover 90, in particular the front cover 92 and the rear cover 94, are lower than the engine 114, and define an under side of the engine room S.

Figure 8:
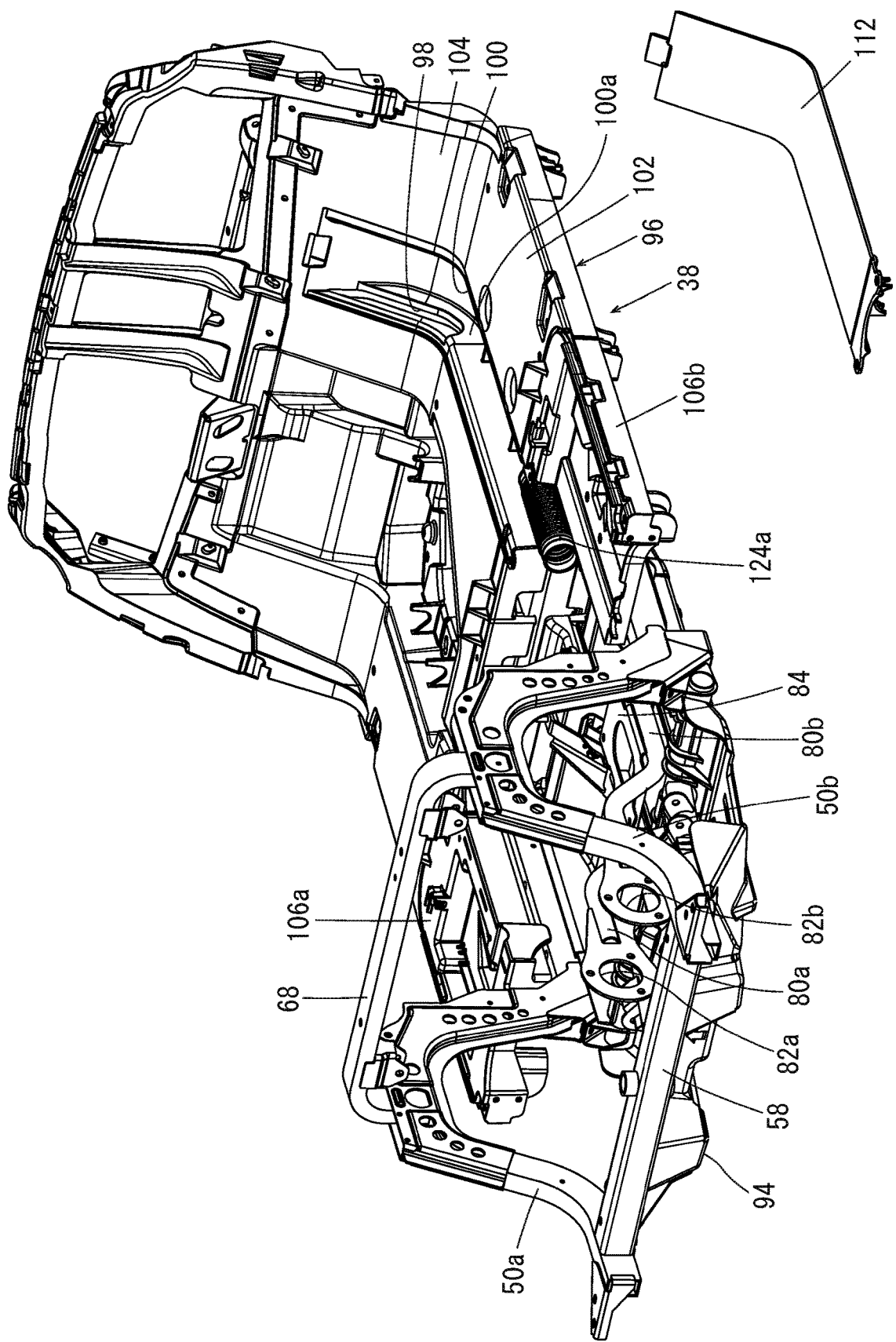
Figure 9:
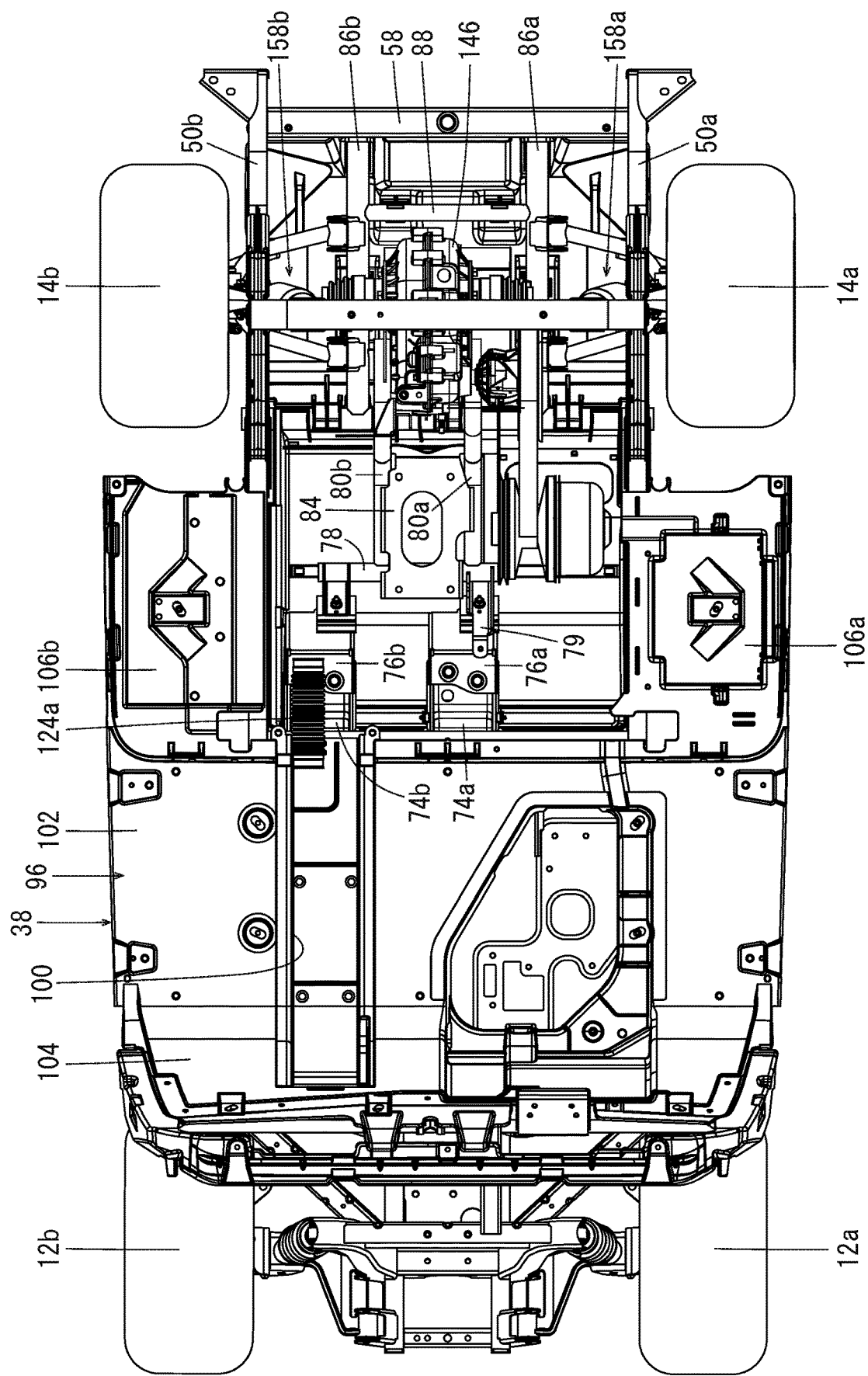
Figure 10:
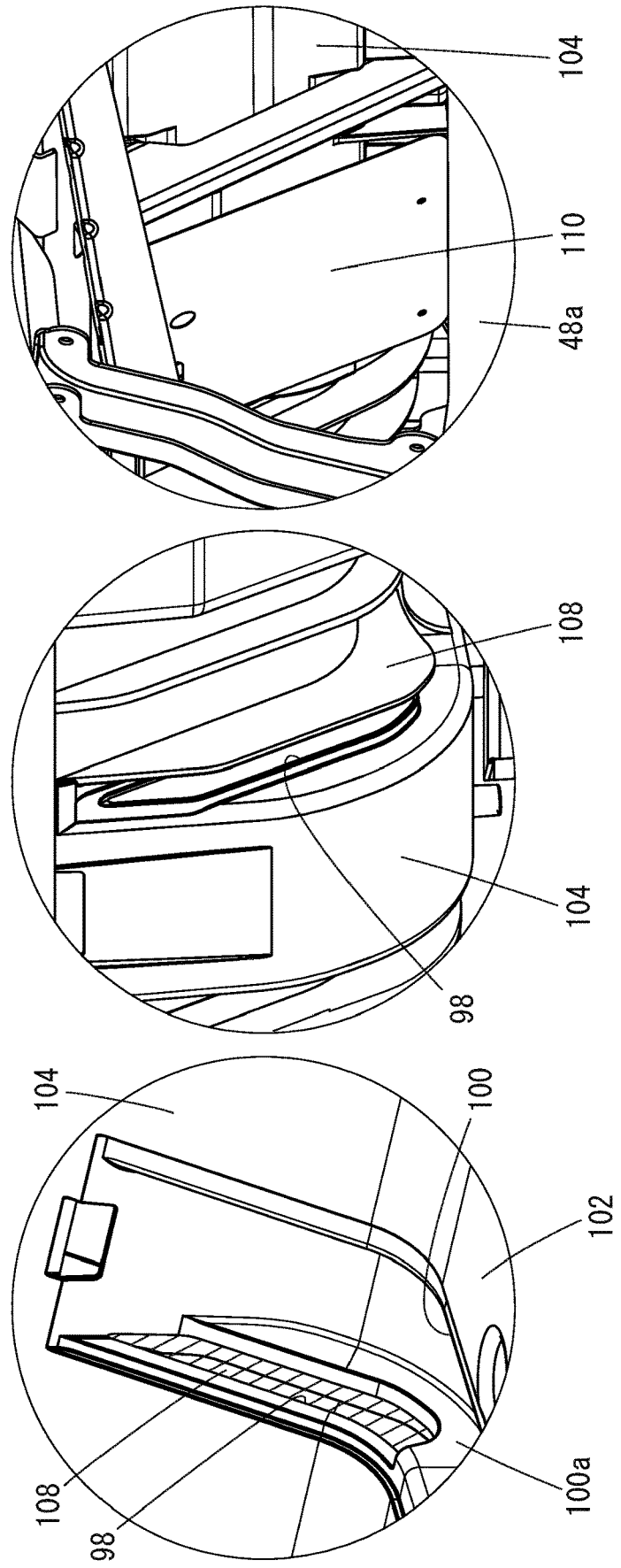
FIG. 10A is an enlarged view showing an opening.
FIG. 10B is an enlarged view showing a plate-shaped member.
FIG. 10C is an enlarged view showing a cover.
Figure 11:
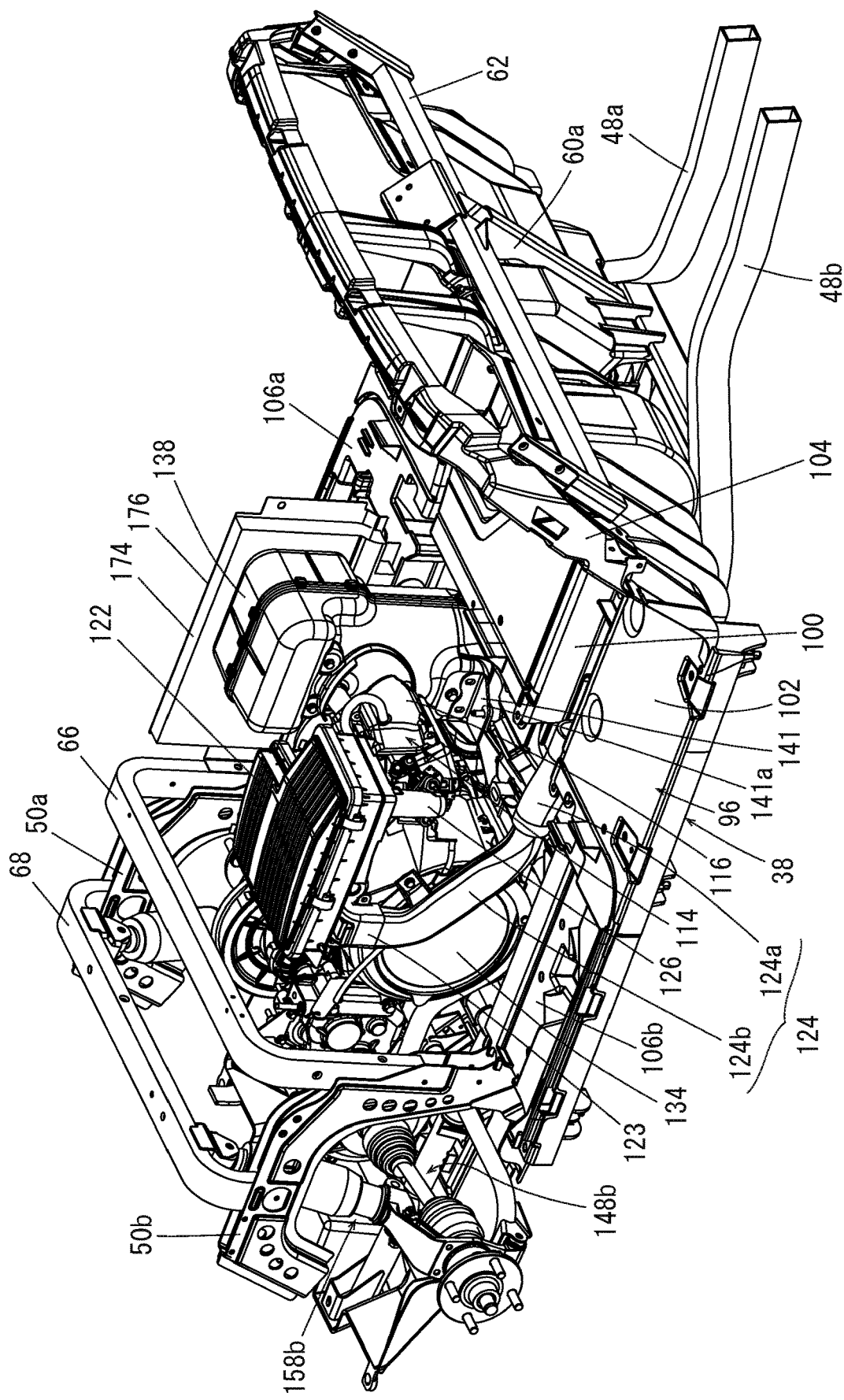
FIG. 11 is a front perspective view showing a primary portion of the golf car.

Referring to FIG. 8 and FIG. 9, the floor panel 38 is provided on the front frames 48a, 48b and the cross member 62 of the frame 16. The floor panel 38 is located between the pair of front wheels 12a, 12b and the pair of rear wheels 14a, 14b. The floor panel 38 includes a panel main body 96, an opening 98, and a groove 100. The panel main body 96 includes a first panel 102 extending horizontally or substantially horizontally in the fore-aft direction between the front wheels 12a, 12b and the rear wheels 14a, 14b; a second panel 104 located behind the front wheels 12a, 12b and extending upward from a front end region of the first panel 102; and third panels 106a, 106b extending rearward from left and right rear end regions of the first panel 102. The first panel 102 is located ahead of the engine room S; the third panel 106a is located on the left side of the engine room S; and the third panel 106b is located on the right side of the engine room S. Preferably, the second panel 104 rises obliquely forward from the front end region of the first panel 102. The opening 98 is located at a front region of the panel main body 96, i.e., in the second panel 104 (see FIG. 10A). FIG. 10A shows the opening 98 with hatching. The groove 100 communicates with the opening 98 in order to supply external air which is introduced from the opening 98 into a shroud 132 (which will be described below) and into the engine 114, is located on an upper surface of the panel main body 96, and extends in a fore-aft direction of the panel main body 96. The groove 100 is continuous from the second panel 104 to the first panel 102, provides communication between the opening 98 and the engine room S, and is able to introduce a running wind from ahead of the golf car 10 to the engine room S. In the present preferred embodiment, the groove 100 is preferably located slightly to the right of the center in the vehicle width direction. The opening 98 is located in a side surface 100a of the groove 100. Referring to FIGS. 10A and 10B, a plate-shaped member 108, which protrudes forward from a reverse surface (front surface) of the second panel 104, is provided on a side of the opening 98. Also, referring to FIG. 10C, a rectangular plate-shaped cover 110, which is supported by the frame 16, is provided ahead of the opening 98. Further, the groove 100 is covered by a lid 112 (see FIG. 8). The lid 112 is defined by a strip-shaped and plate-shaped member having a longitudinal shape of the groove 100.

Referring to FIG. 11 through FIG. 17, inside the engine room S, the engine bracket 84 supports the engine 114. The engine 114 is preferably an air-cooled engine including a single cylinder, for example. The engine 114 includes a fuel injector 115 which injects fuel into an air intake tube 126. The engine 114 is located behind the first panel 102 of the floor panel 38, and includes a cylinder head 116, a cylinder body 118, and a crank case 120. The engine 114 is preferably tilted forward. An air cleaner 122 is provided above the engine 114. The air cleaner 122 is joined to an air intake duct 124 via a joint 123. The air intake duct 124 is located on the right side of the air cleaner 122, and includes a cylindrical front duct 124a and a noise-reducing rear duct 124b having a flattened shape. A rear end portion of the front duct 124a and a front end portion of the rear duct 124b are joined to each other. In order to introduce the external air from the groove 100, the front duct 124a faces the groove 100 from the engine room S, and a rear end portion of the rear duct 124b is joined to the joint 123. Thus, the air intake duct 124 and the air cleaner 122 communicate with each other. As indicated by Arrow X in FIG. 16, the external air, which is introduced from ahead and comes through the opening 98 and into the groove 100, is then introduced into the air cleaner 122 from the groove 100 via the air intake duct 124. Then, after being cleaned by the air cleaner 122, the air is supplied, via the air intake tube 126, into the engine 114. As described above, the air cleaner 122 is provided between the air intake duct 124 and the engine 114. Inside the engine room S, a muffler 128 is provided adjacent a side (on the left side in the present preferred embodiment) of the engine 114. The engine 114 and the muffler 128 are joined to each other via an exhaust pipe 130. Exhaust gas from the engine 114 is supplied to the muffler 128 via the exhaust pipe 130. The exhaust pipe 128a of the muffler 128 includes a rear end portion, to which a joint exhaust 128b including an unillustrated silencer is attached (see FIG. 22).

Figure 20:
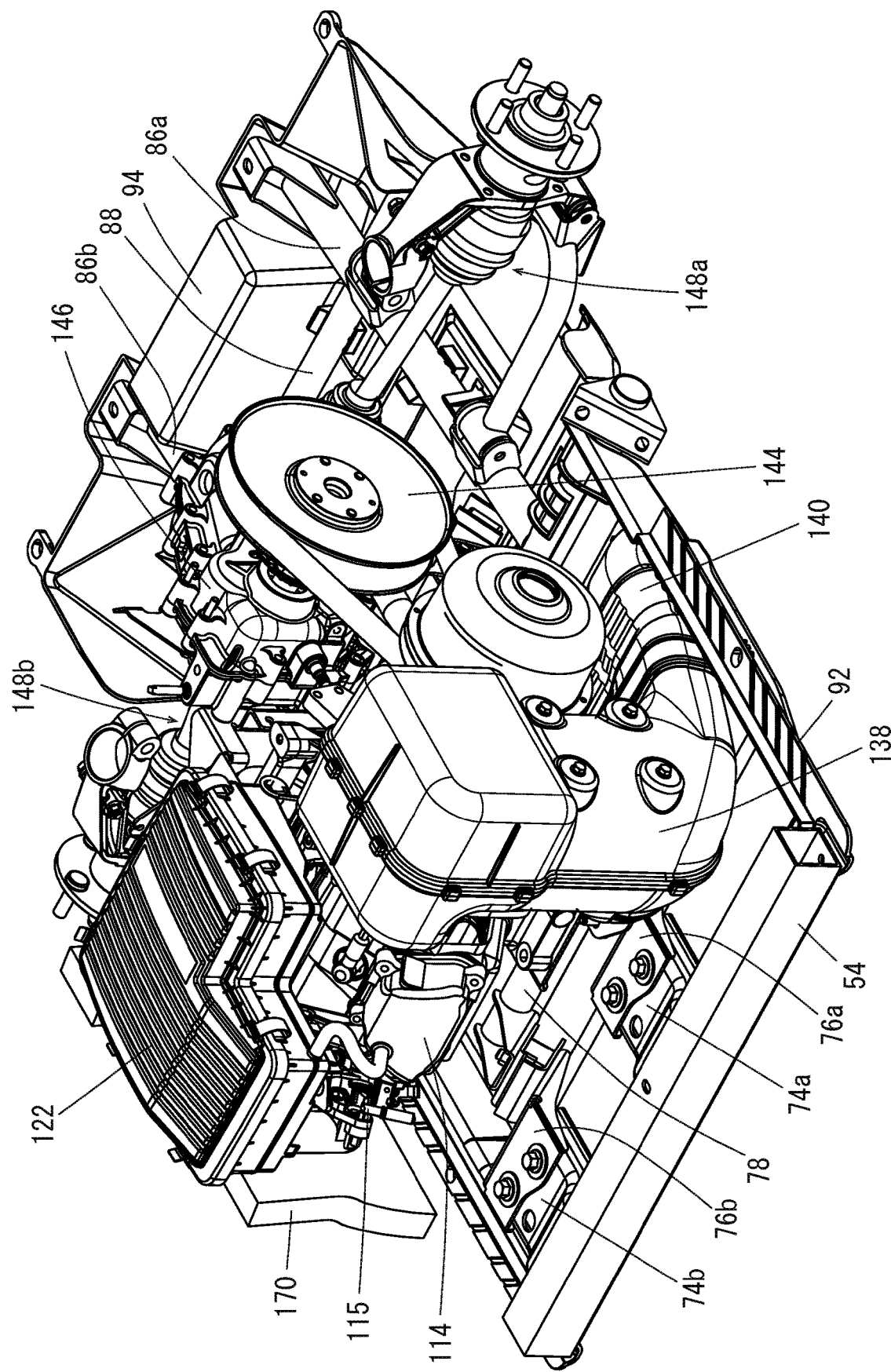
FIG. 20 is a front perspective view showing the engine, the muffler cover, and their surroundings.
Figure 21:
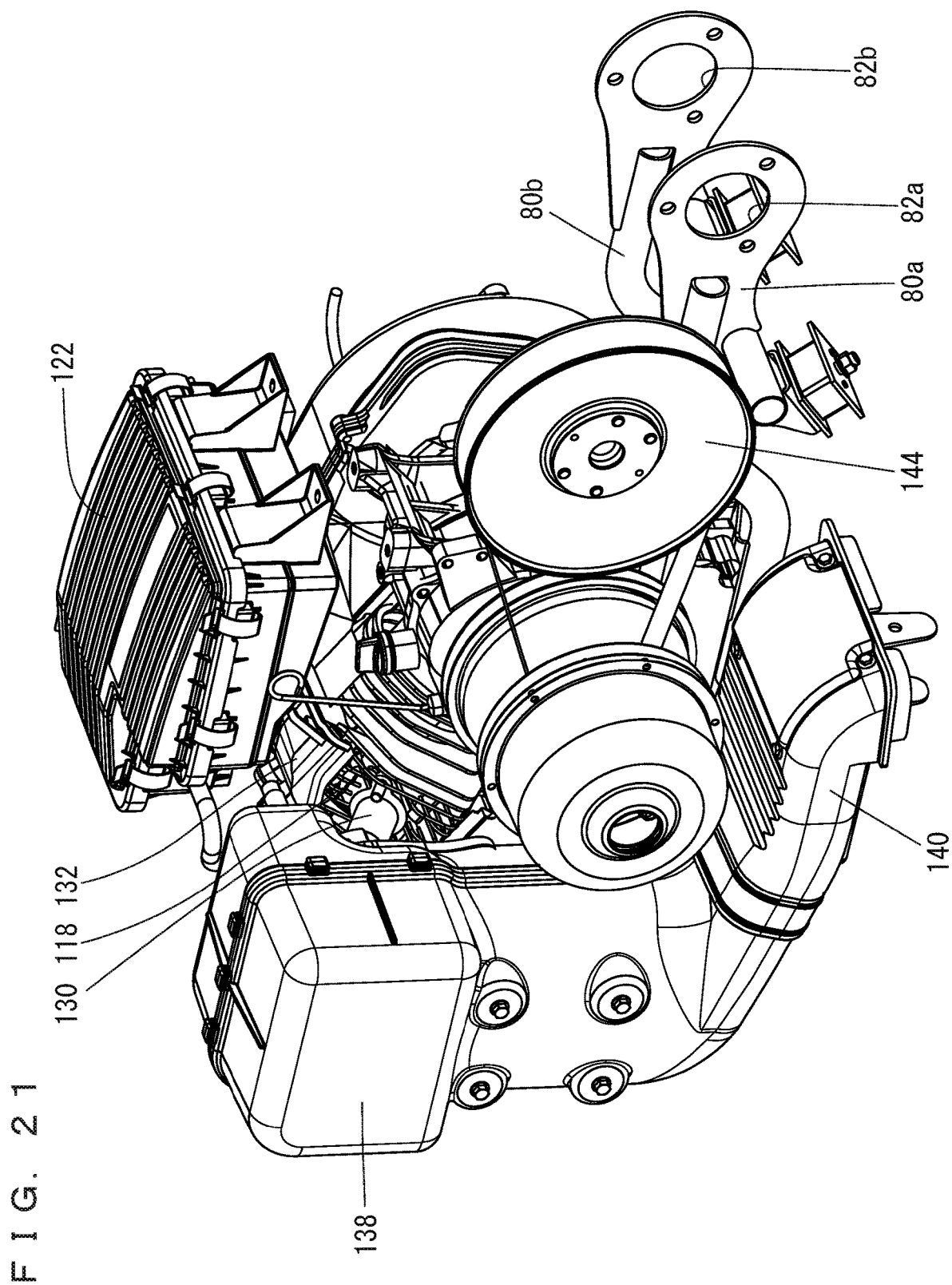
FIG. 21 is a rear perspective view showing the engine, the muffler cover, and their surroundings.
Figure 22:
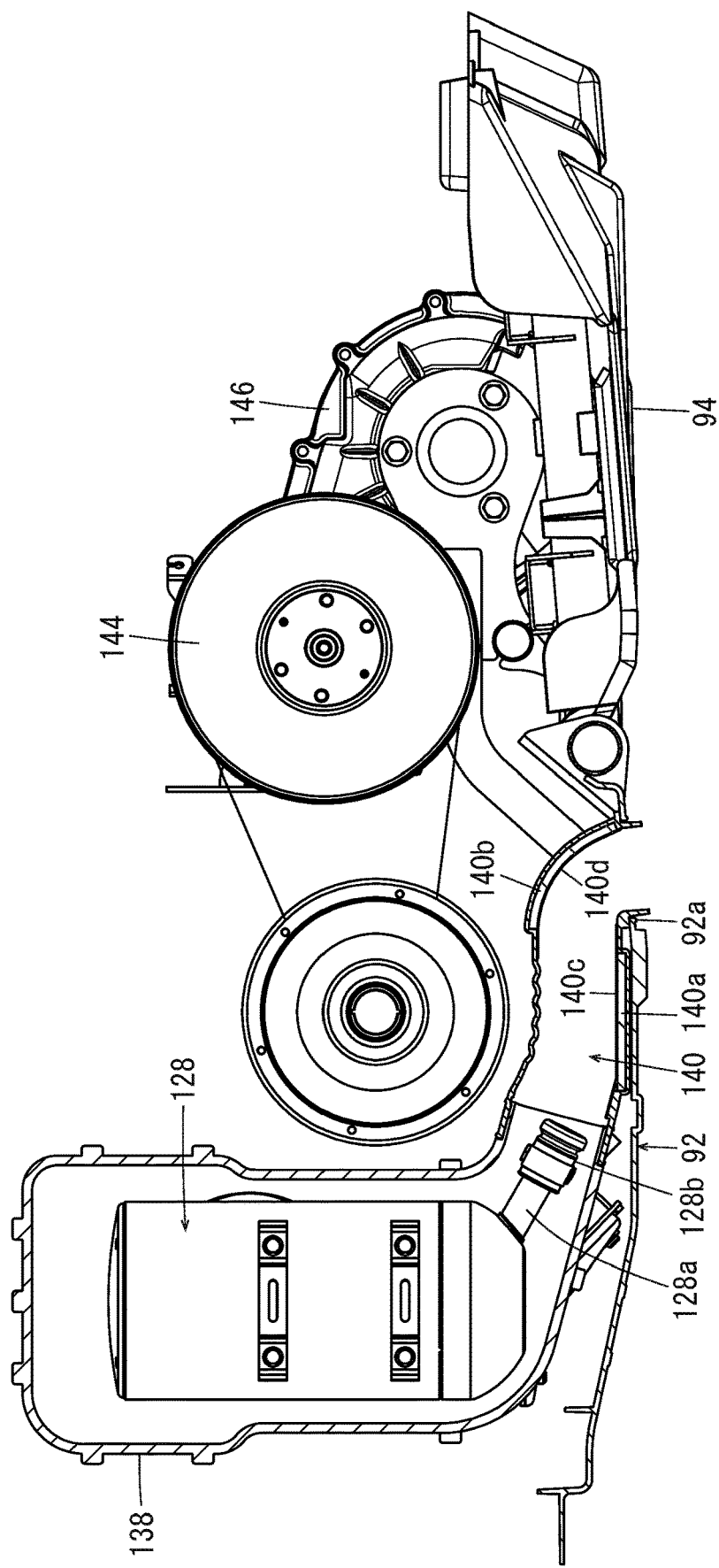
FIG. 22 is a side view with a partial section taken along a line C-C in FIG. 19 to show the muffler, the muffler cover, an exhaust duct, and their surroundings.

The cylinder body 118 of the engine 114 is covered by the shroud 132, with an air-flowable gap between the cylinder body 118 and the shroud 132. A fan case 134 is provided on a side surface (on the right side surface in the present preferred embodiment) of the engine 114. The shroud 132 and the fan case 134 are connected to each other. Inside the fan case 134, there is provided a fan 136 to supply the external air from the groove 100 into the shroud 132 (between the shroud 132 and the engine 114). The fan 136 is preferably connected to a crank shaft 142 (see FIG. 18) and driven thereby. Also, the muffler 128 is covered by a muffler cover 138 so that an air-flowable gap is provided between the muffler 128 and the muffler cover 138. The muffler cover 138 is preferably made of a resin, for example, is provided with an insulation member on its inner surface, and has a substantially rectangular tubular upper portion and a substantially cylindrical lower portion. The shroud 132 and the muffler cover 138 communicate with each other via a duct 139 which covers the exhaust pipe 130. It should be noted here that FIG. 11, FIG. 12, FIG. 20, and FIG. 21 do not show the duct 139. Referring to FIG. 22, an exhaust duct 140 is connected to an exit end portion of the muffler cover 138. The exhaust duct 140 includes an inner circumferential surface provided with sound absorbing members 140a, 140b made of glass wool, for example. The sound absorbing members 140a, 140b are held on an inner circumferential surface of the exhaust duct 140 respectively by holders 140c, 140d made of a punching metal, for example. The exhaust duct 140 includes a rear end portion attached to an opening 92a of the front cover 92 and exposed to the outside from the opening 92a (see FIG. 7, FIG. 20 and FIG. 22). The opening 92a is located at a more rearward position than the center of the front cover 92 in the fore-aft direction, and is located at a more rearward position than the muffler cover 138, in a side view. Also, in a side view, the opening 92a is located at a more rearward position than the muffler 128. The muffler cover 138 is supported by the support frame 79 (see FIG. 4 and FIG. 11), as the projection 79a of the support frame 79 is inserted through a hole 141a of a bracket 141 attached on a side surface of the muffler cover 138. As indicated by Arrow Y in FIG. 17 and FIG. 18, the external air which is introduced into the shroud 132 by the fan 136 flows between the shroud 132 and the engine 114 (the cylinder body 118), into the muffler cover 138 (between the muffler cover 138 and the muffler 128), and defines a cooling wind to cool the engine 114 and the muffler 128. Then, the air inside the muffler cover 138 flows through the exhaust duct 140 and is discharged from the opening 92a of the front cover 92 to the outside below the engine room S.

Referring also to FIG. 18 through FIG. 21, an output from the crank shaft 142 of the engine 114 is transmitted via the CVT 144 to the transmission 146. The CVT 144 is located behind the muffler 128, and the transmission 146 is located behind the engine 114 between the pair of rear wheels 14a, 14b.

The engine 114, the muffler 128, the shroud 132, the muffler cover 138, the exhaust duct 140, the CVT 144, and the transmission 146 are housed in the engine room S.

Referring also to FIG. 4, the transmission 146 is joined to a pair of rotation transmission portions 148a, 148b. The rotation transmission portion 148a extends to the left of the transmission 146, and includes a constant-velocity joint 150a, a drive shaft 152a, a constant-velocity joint 154a, and an axle 156a. The transmission 146 includes an output shaft (not illustrated) connected to the drive shaft 152a by the constant-velocity joint 150a, whereas the drive shaft 152a and the axle 156a are connected to each other by the constant-velocity joint 154a. The rotation transmission portion 148b extends to the right of the transmission 146, and includes a constant-velocity joint 150b, a drive shaft 152b, a constant-velocity joint 154b, and an axle 156b. The transmission 146 includes an output shaft connected to the drive shaft 152b by the constant-velocity joint 150b, whereas the drive shaft 152b and the axle 156b are connected to each other by the constant-velocity joint 154b. The axle 156a supports the rear wheel 14a, whereas the axle 156b supports the rear wheel 14b. It should be noted here that the through-hole 82a at the rear end portion of the support frame 80a is penetrated by the output shaft of the transmission 146 between the transmission 146 and the constant-velocity joint 150a, whereas the through-hole 82b at the rear end portion of the support frame 80b is penetrated by the output shaft of the transmission 146 between the transmission 146 and the constant-velocity joint 150b (see FIG. 13).

Also, the pair of rear wheels 14a, 14b are suspended by a pair of suspensions 158a, 158b. In the present preferred embodiment, the pair of suspensions 158a, 158b are preferably independent suspension systems. The pair of suspensions 158a, 158b include knuckles 160a, 160b, arms 162a, 162b, and shock absorbers 164a, 164b respectively. The knuckle 160a rotatably supports the axle 156a. The arm 162a connects a lower portion of the knuckle 160a and the frame 86a to each other. The shock absorber 164a includes a lower end portion and an upper end portion, respectively joined to an upper end portion of the knuckle 160a and to the connection frame 68. Likewise, the knuckle 160b rotatably supports the axle 156b. The arm 162b connects a lower portion of the knuckle 160b and the frame 86b to each other. The shock absorber 164b includes a lower end portion and an upper end portion, respectively joined to an upper end portion of the knuckle 160b and to the connection frame 68.

Figure 12:
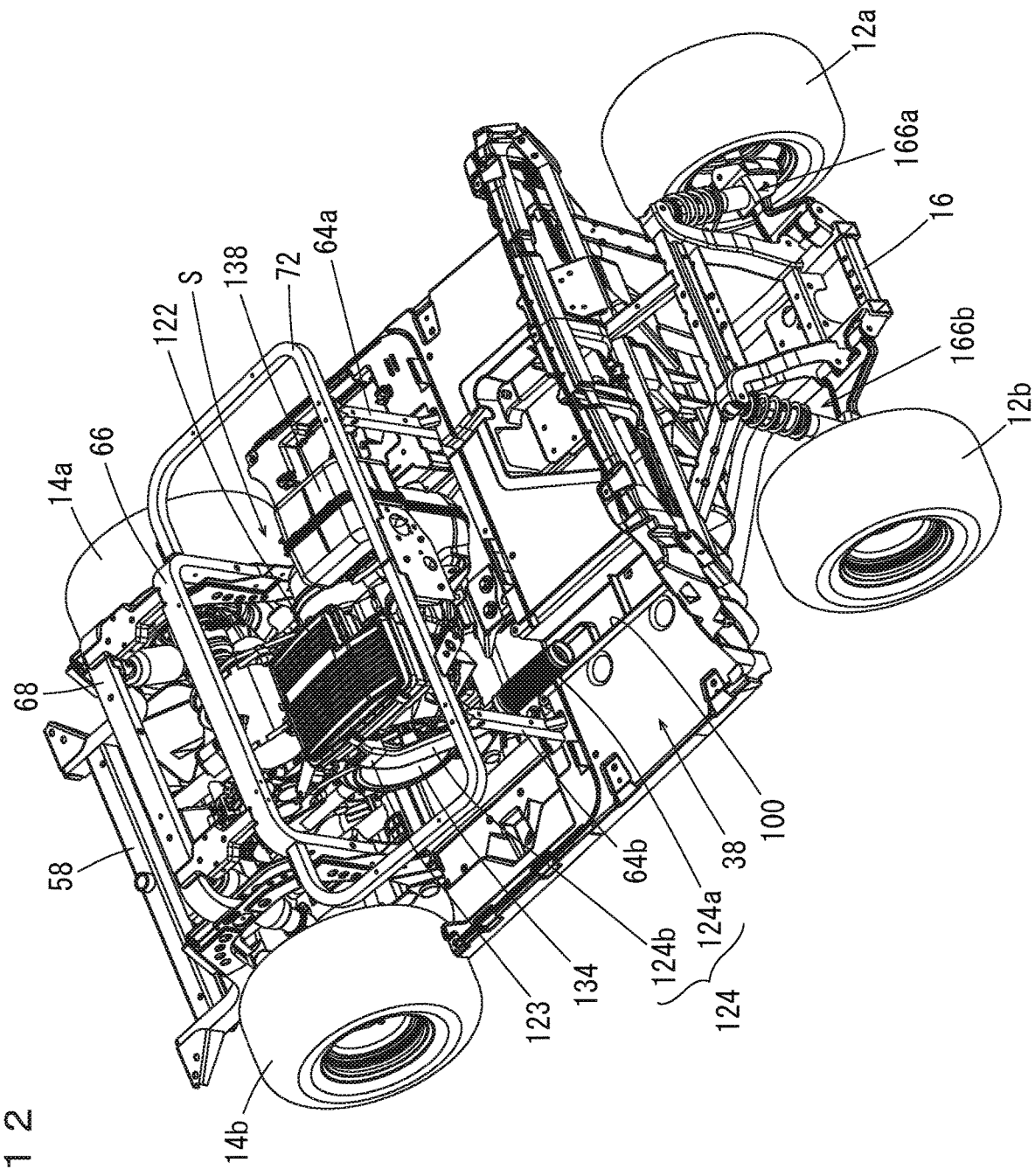
FIG. 12 is a front perspective view showing a primary portion of the golf car.
Figure 13:
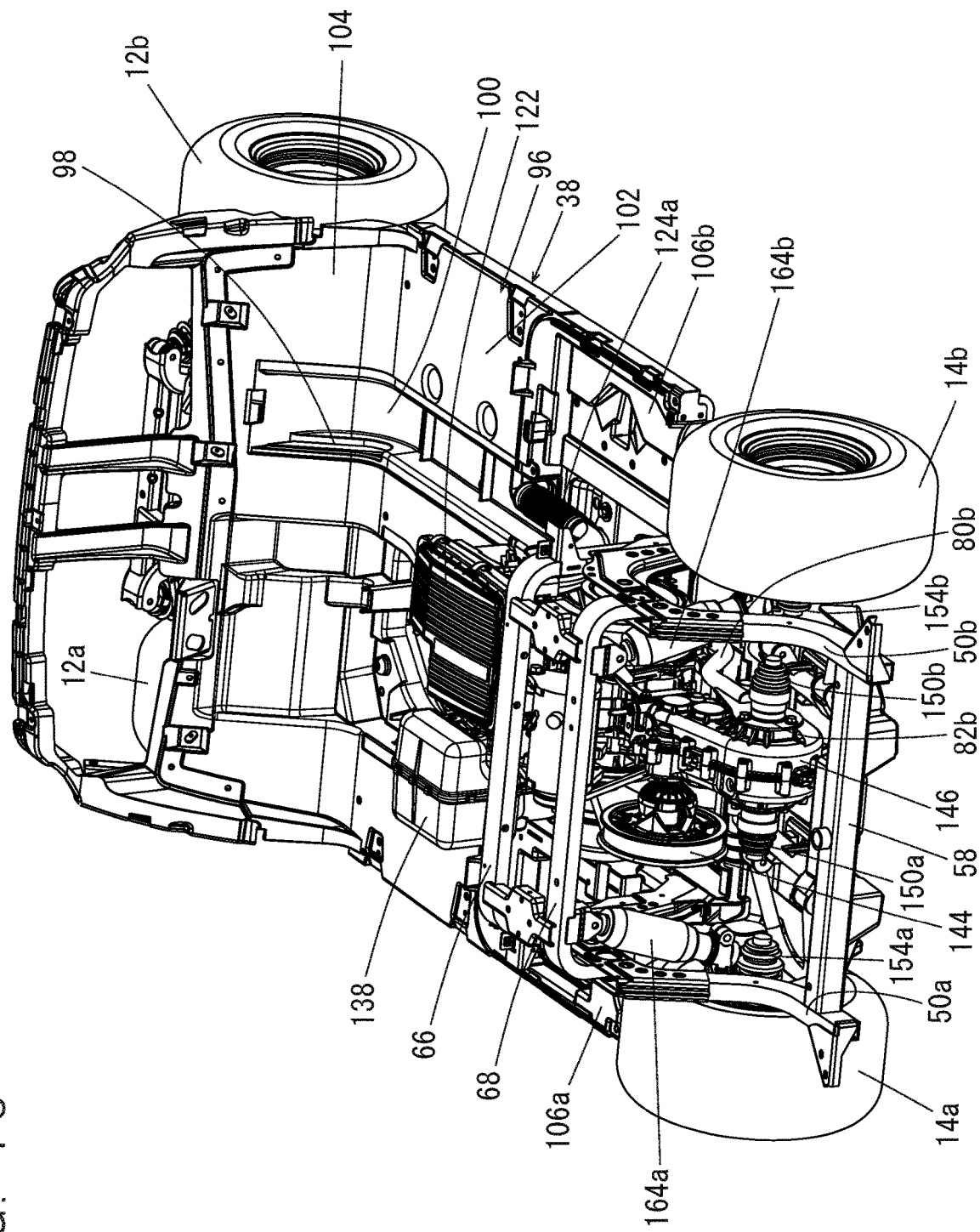
FIG. 13 is a rear perspective view showing a primary portion of the golf car.

Referring to FIG. 12, the pair of front wheels 12a, 12b are suspended by a pair of suspensions 166a, 166b attached to the front region of the frame 16. In the present preferred embodiment, the pair of suspensions 166a, 166b are preferably independent suspension systems.

Figure 14:
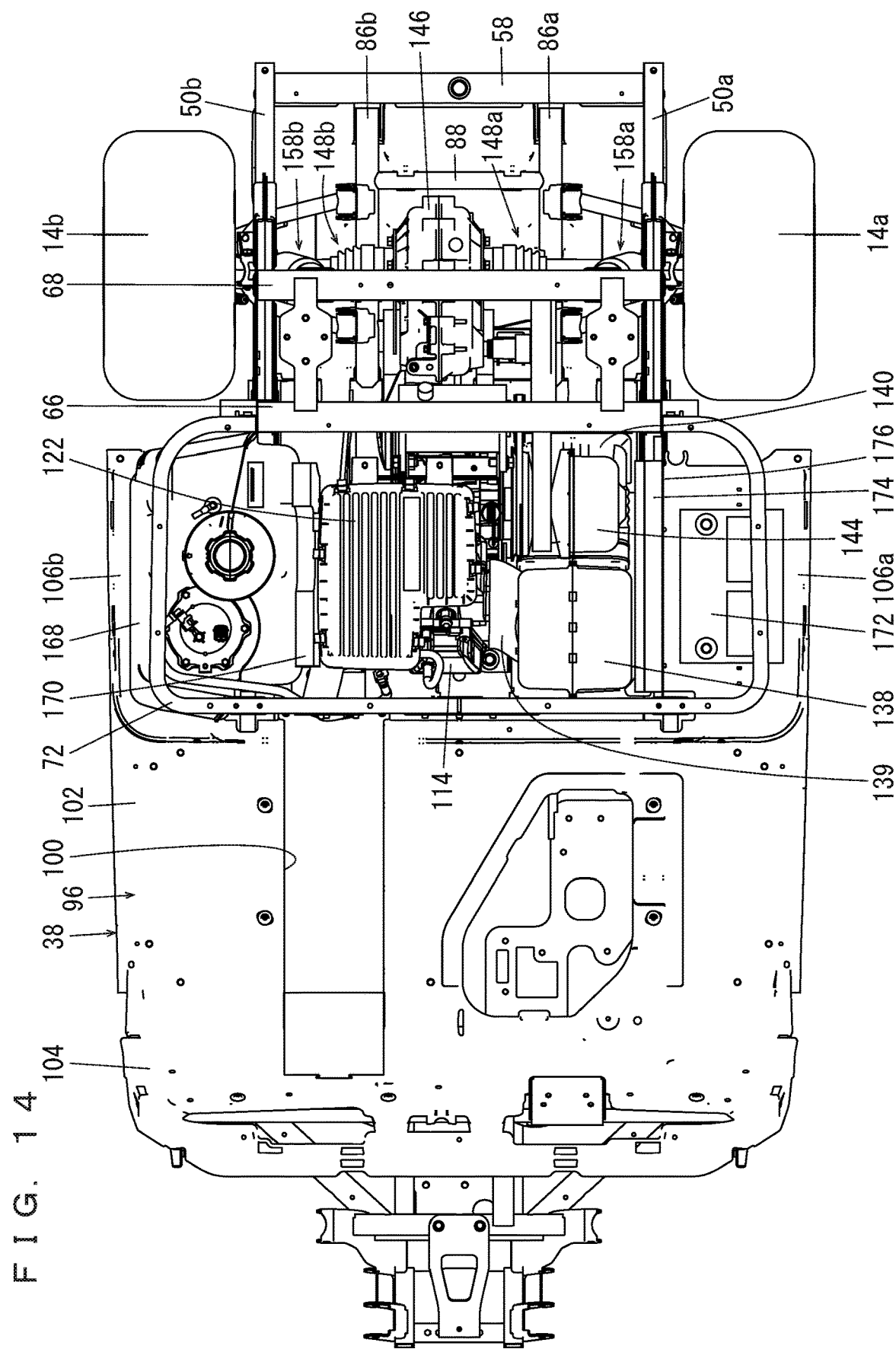
FIG. 14 is a plan view showing a primary portion of the golf car.
Figure 15:
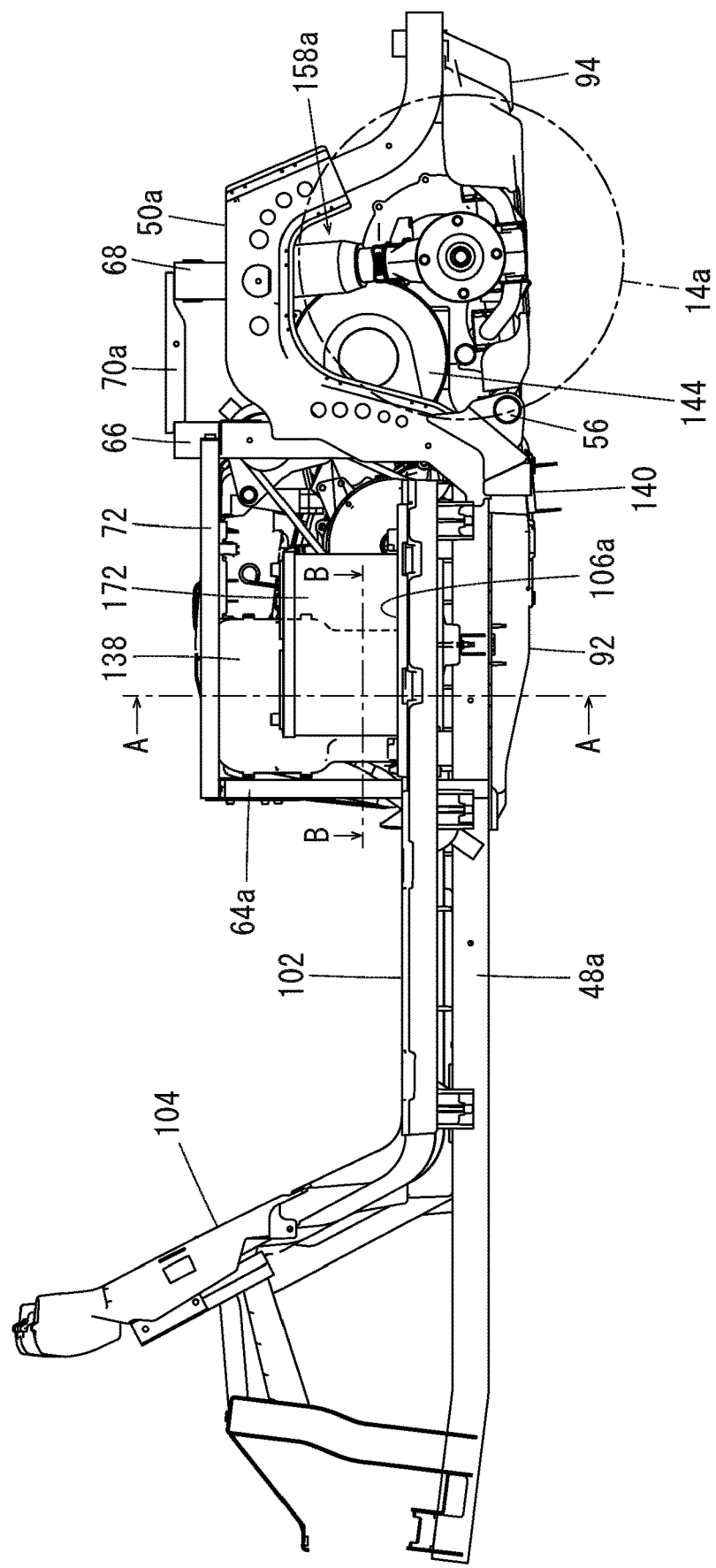
Figure 16:
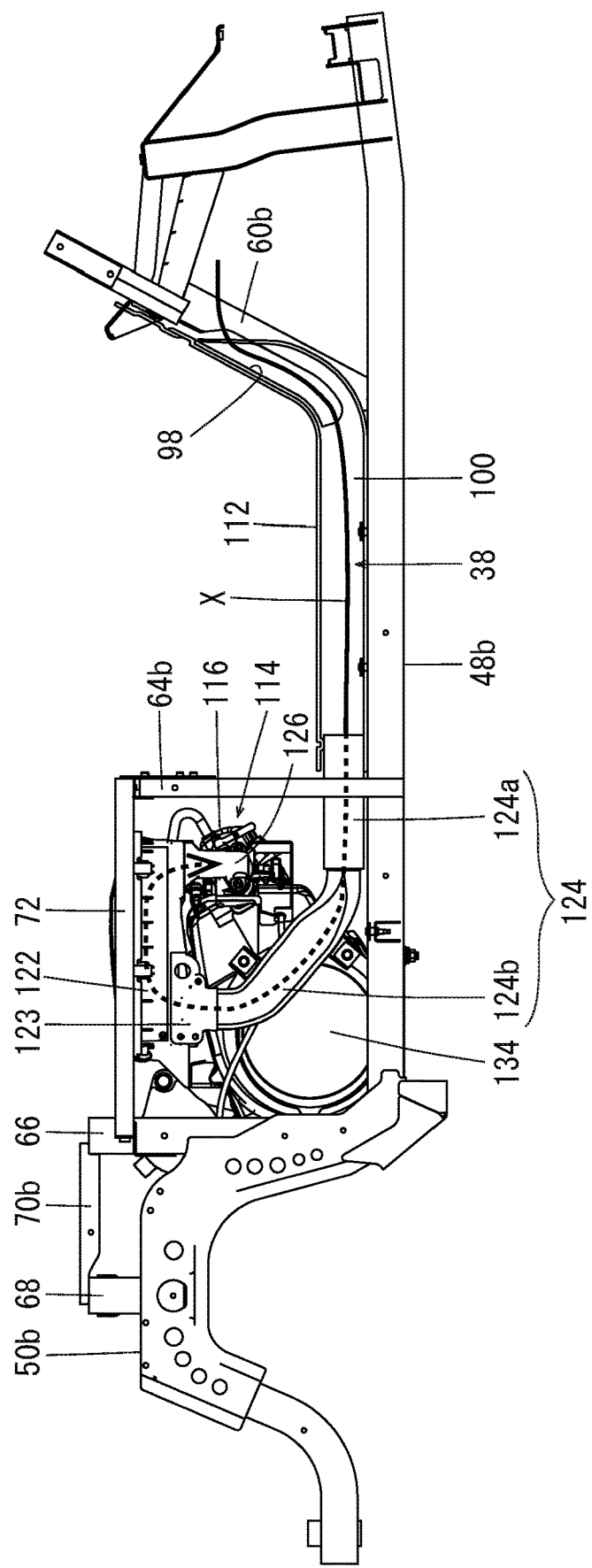
FIG. 16 is a side view (taken from right) showing the frame, a groove and so on, in a state where a portion of the floor panel on a side to the right of the groove is removed.
Figure 17:
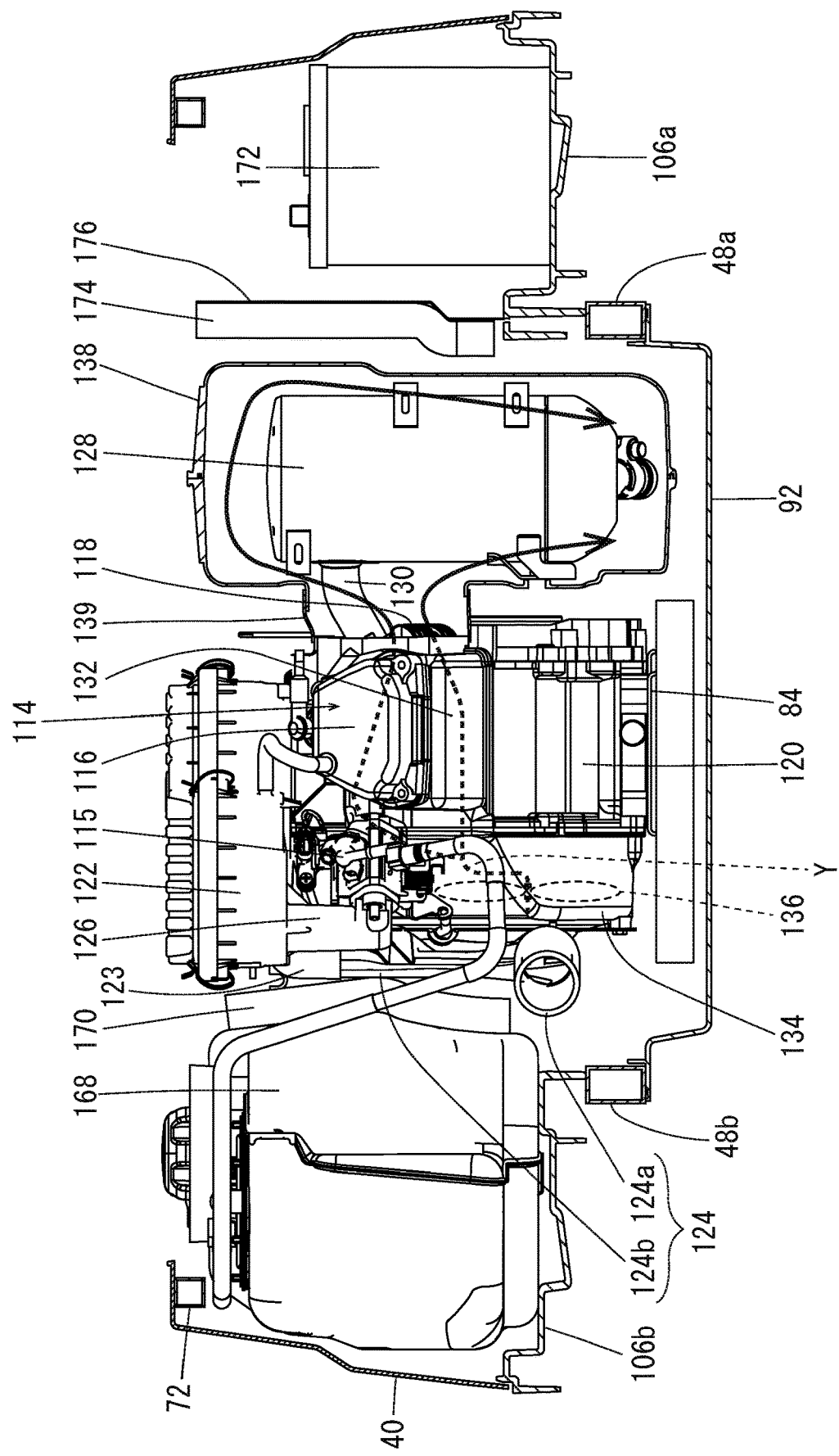
FIG. 17 is a front view with a partial section taken along a line A-A in FIG. 15 to show an engine, a muffler, and their surroundings.
Figure 18:
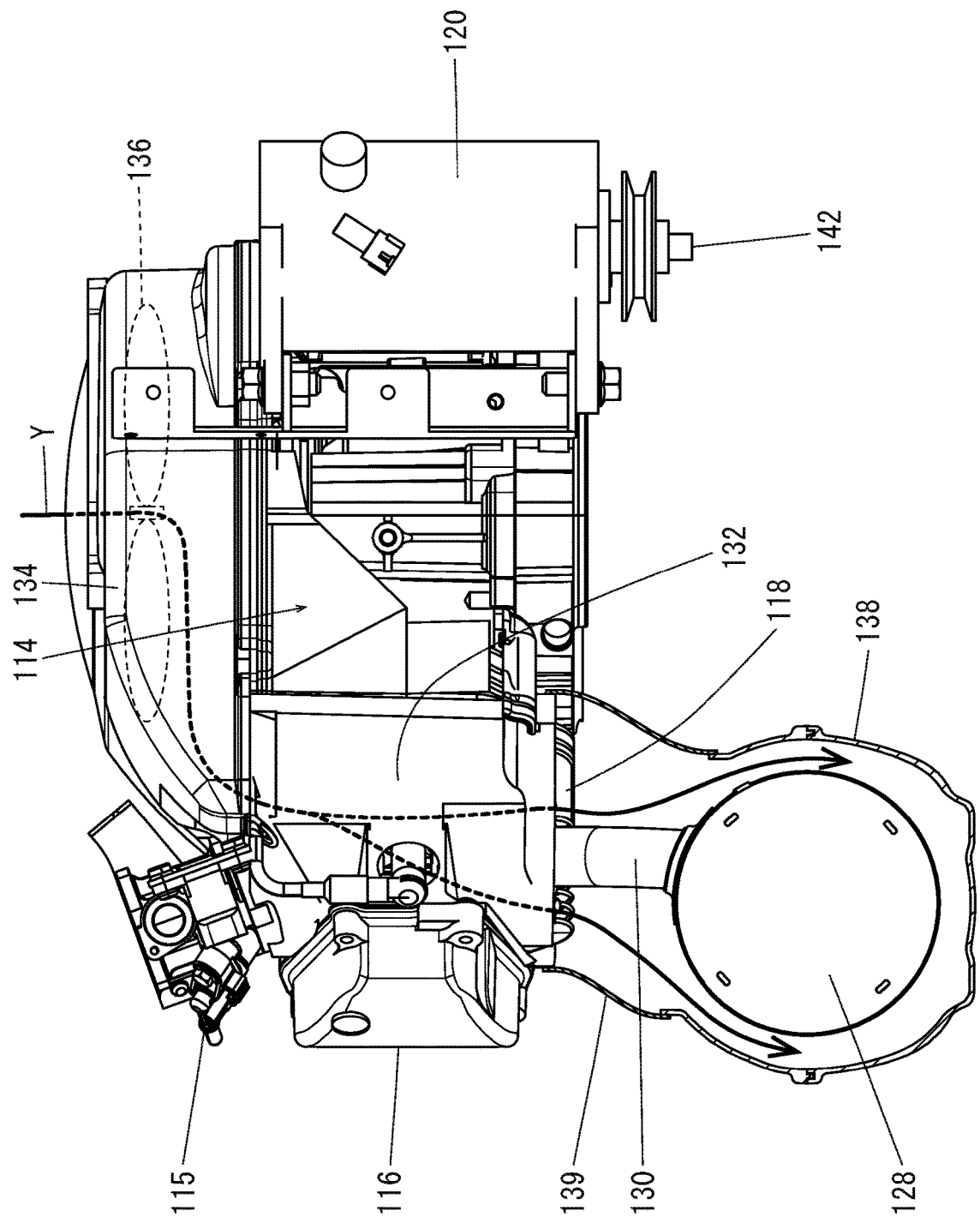
FIG. 18 is a plan view with a partial section taken along a line B-B in FIG. 15 to show the engine, the muffler, and their surroundings.
Figure 19:
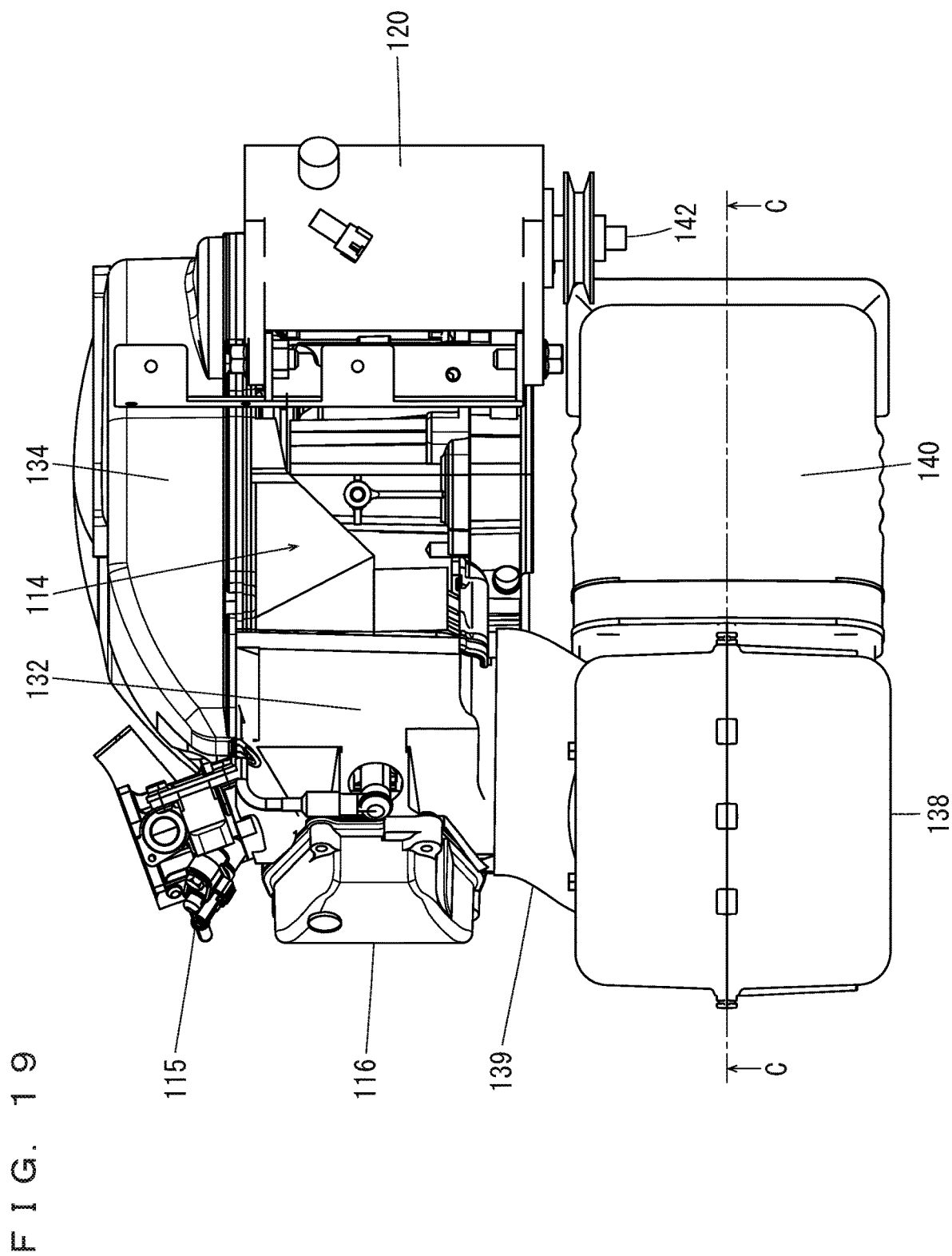
FIG. 19 is a plan view showing the engine, a muffler cover, and their surroundings.

Referring to FIG. 14 and FIG. 17, the fuel tank 168 is located on the right side of the engine 114 and on the third panel 106b of the floor panel 38. Between the engine 114 and the fuel tank 168, a sound absorbing member 170 is provided and attached to a side surface of the fuel tank 168. Also, a battery 172 is located on the left of the muffler cover 138 and on the third panel 106a of the floor panel 38. Between the muffler cover 138 and the battery 172, a two-ply structure including a sound absorbing member 174 and the heat insulation board 176 is provided. It is possible, with the sound absorbing members 170 and 174, to absorb noise from the engine room S, whereas it is possible, with the heat insulation board 176, to reduce or prevent heat conducting from the engine room S to the battery 172.

Figure 23A:
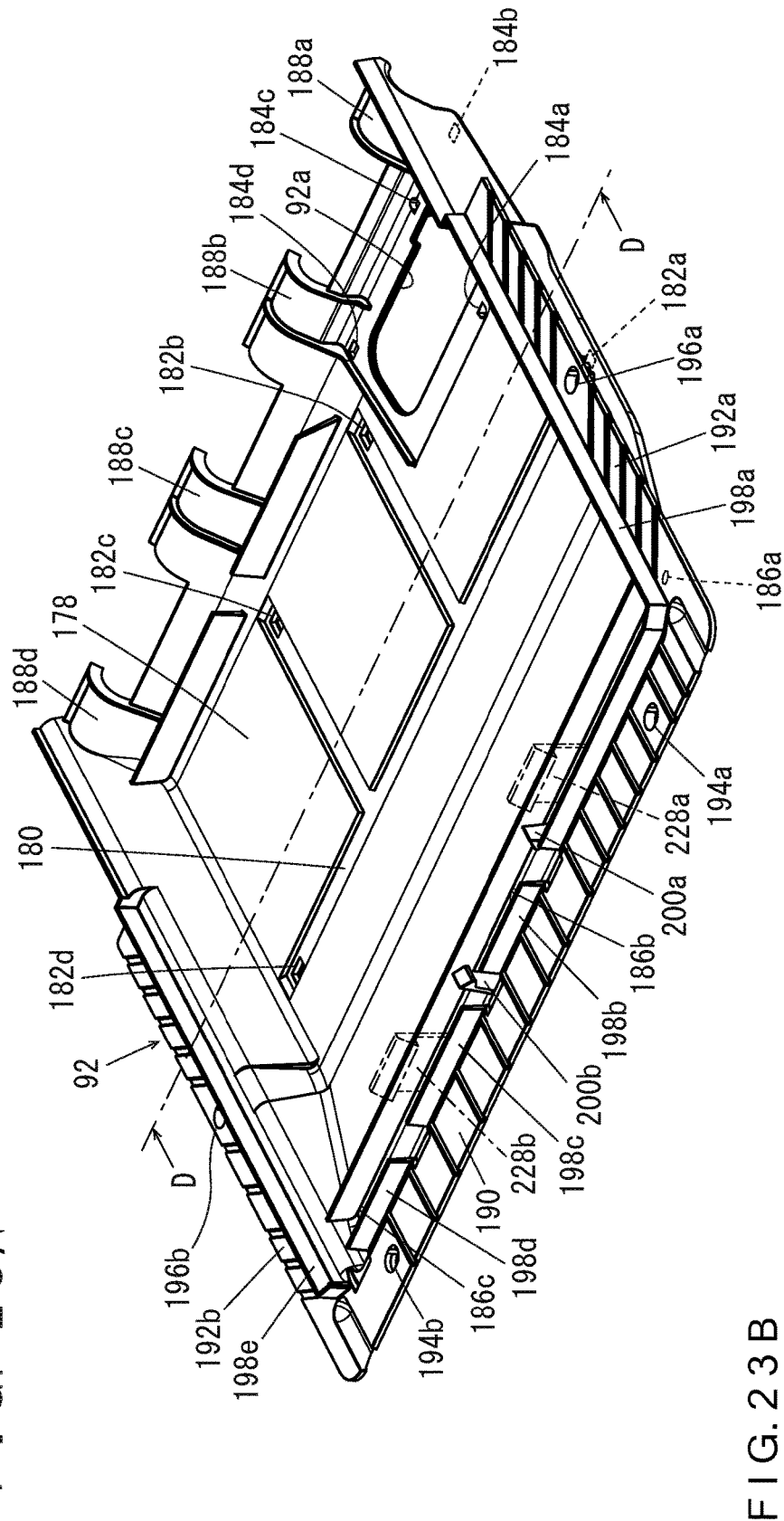
FIG. 23A is a perspective view showing the front cover.
Figure 23B:
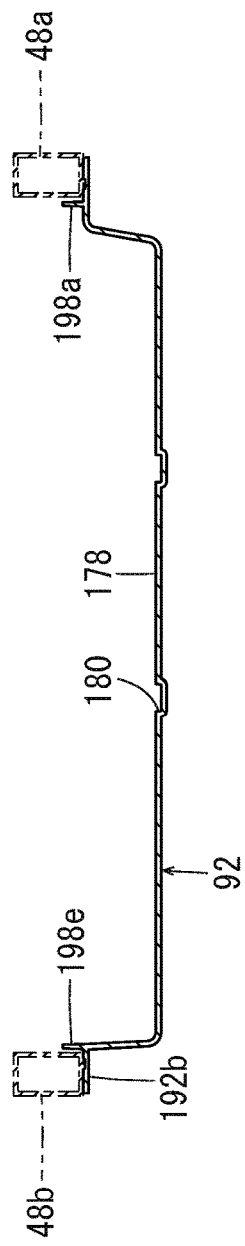
FIG. 23B is a sectional view taken along a line D-D in FIG. 23A.
Figure 24:
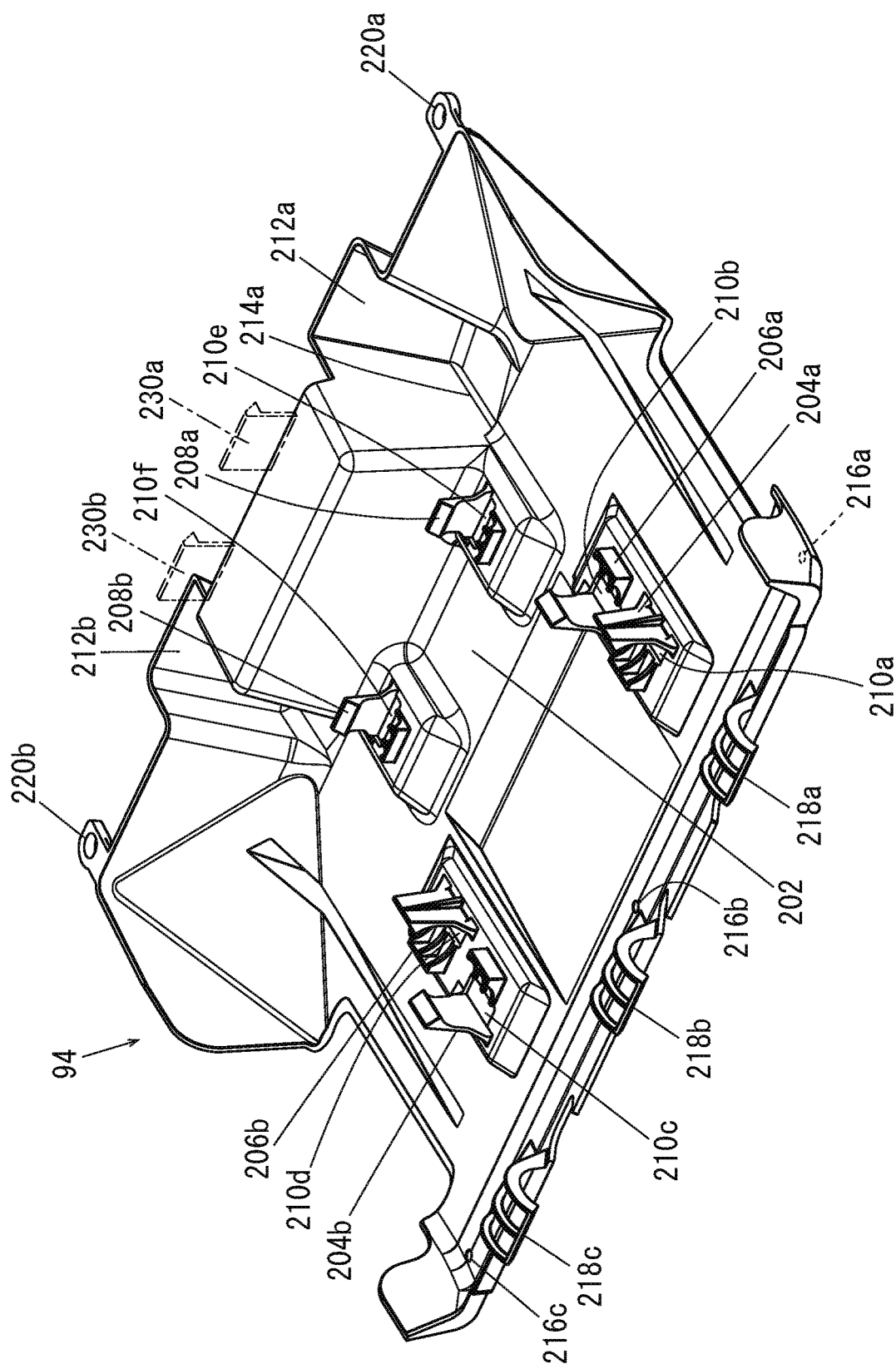
FIG. 24 is a perspective view showing a rear cover.

Referring to FIG. 23 and FIG. 24, the front cover 92 and the rear cover 94 of the undercover 90 will be described.

The front cover 92 includes a cover main body 178. The cover main body 178 includes an upper surface provided with a groove 180 to drain water. The groove 180 extends in the width direction (left and right) and in the fore-aft direction in a rear region of the cover main body 178. In the groove 180, four water drainage holes 182a through 182d are provided at two side regions and rear end regions. The opening 92a is located at a rear left corner of the cover main body 178. Around the opening 92a, four water drainage holes 184a through 184d are provided. Also, three water drainage holes 186a through 186c are provided at a space in the width direction in a front end region of the cover main body 178. In a rear end region of the cover main body 178, four pawls 188a through 188d extend obliquely in an upward and rearward direction defining upward convex curves in a space in the width direction. In the front end region of the cover main body 178, a brim-shaped portion 190 protrudes forward. In two side regions of the cover main body 178, brim-shaped portions 192a, 192b protrude laterally respectively. The brim-shaped portion 190 is provided with two screw holes 194a, 194b. The brim-shaped portions 192a, 192b are provided with screws holes 196a, 196b respectively. In the cover main body 178, the brim-shaped portions 190, 192a, 192b are provided with upward protruding ribs 198a through 198e on their inner sides. Also, in the cover main body 178, two pawls 200a, 200b are provided at an intermediate position of its front end region. By providing the groove 180 in an upper surface of the cover main body 178, it is easy to guide water to the holes 182a through 182d. With the ribs 198a through 198e, it is possible to close gaps between the cover main body 178 (front cover 92) and the cross member 54, and between the cover main body 178 (front cover 92) and the front frames 48a, 48b.

The rear cover 94 includes a cover main body 202. The cover main body 202 includes an upper surface provided with holders 204a, 206a to hold the frame 86a; holders 204b, 206b to hold the frame 86b; and holders 208a, 208b to hold the cross member 88. Near the holders 204a, 206a, 204b, 206b, 208a, 208b, there are water drainage holes 210a, 210b, 210c, 210d, 210e, 210f, respectively. The cover main body 202 is provided with storage portions 212a, 212b that store rear end portions of the frames 86a, 86b. The storage portions 212a, 212b include water drainage holes 214a, 214b (see FIG. 7) respectively. Also, three water drainage holes 216a through 216c are provided in a space in the width direction in a front end region of the cover main body 202. In the front end region of the cover main body 202, three pawls 218a through 218c extend obliquely in an upward and forward direction, defining upward convex curves in a space in the width direction. At rear ends of both side regions of the cover main body 202, screw holes 220a, 220b are provided.

When attaching the front cover 92 to the frame 16, first, the pawls 188a through 188d at a rear end region of the front cover 92 are engaged with the cross member 56 from the front. In this state, the front cover 92 is pivoted around the pawls 188a through 188d to bring the brim-shaped portion 190 into contact with the lower surface of the cross member 54, and bring the brim-shaped portions 192a, 192b into contact with the lower surfaces of the front frames 48a, 48b. During this process, the ribs 198a through 198e make contact with side surfaces of the cross member 54 and of the front frames 48a, 48b. Also, the pawls 200a, 200b engage with the bracket 74a from both sides in the width direction. Then, with fasteners 222 (see FIG. 7) such as bolts inserted through the holes 194a, 194b, the brim-shaped portion 190, which is located at a front end region of the front cover 92, is fixed to the cross member 54. Also, with fasteners 224 (see FIG. 7) such as bolts inserted through the holes 196a, 196b, the brim-shaped portions 192a, 192b, which are at two side regions of the front cover 92, are fixed to the front frames 48a, 48b. Thus, the front cover 92 is fixed to the cross member 54 and the front frames 48a, 48b.

Also, when attaching the rear cover 94 to the frame 16, first, the pawls 218a through 218c at a front end region of the rear cover 94 are engaged with the cross member 56 from the rear. In this state, the rear cover 94 is pivoted around the pawls 218a through 218c to bring an upper end surface of the storage portions 212a, 212b into contact with the lower surface of the cross member 58. This process causes the holders 204a, 206a to hold the frame 86a, the holders 204b, 206b to hold the frame 86b, and the holders 208a, 208b to hold the cross member 88. Then, with fasteners 226 (see FIG. 7) such as bolts inserted through the screw holes 220a, 220b, the rear end region of the rear cover 92 is fixed to the rear frames 50a, 50b.

According to the golf car 10 described above, the rear end region of the front cover 92 and the front end region of the rear cover 94 are engaged with the cross member 56; and thereafter, the front cover 92 is fixed to the cross member 54 and the front frames 48a, 48b, and the rear cover 94 is fixed to the rear frames 50a, 50b to complete the process, and therefore, it is easy to assemble the front cover 92 and the rear cover 94 to the frame 16. On the other hand, the rear end region of the front cover 92 and the front end region of the rear cover 94 are simply engaged with the cross member 56; and therefore, when disassembling, it is only required to detach the front cover 92 from the cross member 54 and the front frames 48a, 48b, and detach the rear cover 94 from the rear frames 50a, 50b. Then, the front cover 92 and the rear cover 94 are easily removed from the frame 16. As described above, it is possible to easily attach/detach the undercover 90. Also, since the rear end region of the front cover 92 and the front end region of the rear cover 94 are simply engaged with the cross member 56, in a case of an impact from below, the rear end region of the front cover 92 and the front end region of the rear cover 94 are moved upward, such that it is possible to absorb the impact. As described above, the undercover 90 is able to absorb impacts from below, and reduce damage or the like to the undercover 90.

Even if water comes inside the engine room S, it is possible to easily drain the water from the holes 182a through 182d, the holes 184a through 184d, the holes 186a through 186c of the front cover 92 and/or from the holes 210a through 210f, the holes 214a, 214b, the holes 216a through 216c of the rear cover 94, out of the engine room S.

Access to the engine room S from below is provided by simply removing the front cover 92. This makes it easy to perform activities such as maintenance procedures inside the engine room S.

Exhaust gas from the muffler 128 passes through the exhaust duct 140 which is connected to the exit end portion of the muffler cover 138 and the opening 92a of the front cover 92, and then to the outside from below the engine room S. In this process, noise from the muffler 128 is attenuated in the exhaust duct 140. Since the exhaust duct 140 is connected to the muffler cover 138, noises propagating through the muffler cover 138, such as vibration noise of the engine 114, are attenuated inside the exhaust duct 140. Therefore, it is possible to reduce noise leakage to the outside of the vehicle.

The exhaust duct 140 is attached to the opening 92a which is located at a more rearward position than the center of the front cover 92 in the fore-aft direction. This makes it easy to perform activities such as maintenance procedures inside the engine room S. Specifically, when the front cover 92 is detached from the cross member 54 and the front frames 48a, 48b; and the front end region of the front cover 92 is moved downward to open the front cover 92 while the rear end region of the front cover 92 is engaged with the cross member 56, an amount of positional change of the front cover 92 is smaller in its rear region than its front region. Since the opening 92a is located at a more rearward position than the center of the front cover 92 in the fore-aft direction, a change in the position of the opening 92a is small if the front cover 92 is opened slightly. Thus, there is no need to remove the exhaust duct 140 from the opening 92a if maintenance procedures are performed in this state.

Since the opening 92a in the front cover 92 is not located beneath the muffler cover 138, but is located at a more rearward position than the muffler cover 138 in a side view, it is possible for the exhaust duct 140 to extend rearward to make the exhaust duct 140 relatively long. Therefore, it is possible to discharge the exhaust gas from below the engine room S toward the rear. Further, this enables further attenuation of the noises from the muffler 128 and the muffler cover 138 inside the exhaust duct 140, and makes it possible to further reduce the noise leakage out of the vehicle.

By using a structure in which the pawls 188a through 188d of the rear end region of the front cover 92 and the pawls 218a through 218c of the front end region of the rear cover 94 are engaged with the cross member 56; and thereafter, the front cover 92 is fixed to the cross member 54 with the fasteners 222 and to the front frames 48a, 48b with the fasteners 224; and the rear cover 94 is fixed to the rear frames 50a, 50b with the fasteners 226, it is easy to assemble the front cover 92 and the rear cover 94 to the frame 16. When disassembling, on the other hand, simple removal of the fasteners 222, 224, which fix the front cover 92 to the cross member 54 and the front frames 48a, 48b; and the fasteners 226, which fix the rear cover 94 to the rear frames 50a, 50b, makes it possible to remove the front cover 92 and the rear cover 94 easily from the frame 16.

In the above-described preferred embodiments, description was made for a case in which the front cover 92 is preferably fixed to the cross member 54 and the front frames 48a, 48b; and the rear cover 94 is fixed to the rear frames 50a, 50b. However, the present invention is not limited to this. In a preferred embodiment of the present invention, the front cover 92 preferably is fixed by a fastener at least to the cross member 54 or to the front frames 48a, 48b, while the rear cover 94 preferably is fixed by a fastener at least to the cross member 58 or to the rear frames 50a, 50b.

For example, there may be a structure in which the front cover 92 is not fixed to the front frames 48a, 48b; the pawls 188a through 188d in the rear end region of the front cover 92 are engaged with the cross member 56; the front end region of the front cover 92 is fixed to the cross member 54; the rear cover 94 does not have the holders 204a, 206a, 204b, 206b, 208a, 208b; the pawls 218a, 218b, 218c in the front end region of the rear cover 94 are engaged with the cross member 56; and a rear end region of the rear cover 94 is fixed to the cross member 58 or to the rear frames 50a, 50b.

In this case, the rear end region of the front cover 92 and the front end region of the rear cover 94 are respectively engaged with the cross member 56; and thereafter, the front end region of the front cover 92 is fixed to the cross member 54 and the rear end region of the rear cover 94 is fixed to the cross member 58 or to the rear frames 50a, 50b to complete the process. This structure makes it even easier to assemble the front cover 92 and the rear cover 94 to the frame 16. On the other hand, the rear end region of the front cover 92 and the front end region of the rear cover 94 are simply engaged with the cross member 56; therefore, when disassembling, it is only required to detach the front end region of the front cover 92 from the cross member 54 and detach the rear end region of the rear cover 94 from the cross member 58 or the rear frames 50a, 50b. Then, the front cover 92 and the rear cover 94 are easily removed from the frame 16. As described, it is possible to easily attach/detach the undercover 90. Also, the rear end region of the front cover 92 and the front end region of the rear cover 94 are simply engaged with the cross member 56; and therefore, in a case of impact from below, the front cover 92 pivots upward around its front end region, the rear cover 94 pivots upward around its rear end region, to easily absorb the impact. As described above, the undercover 90 is able to easily absorb impacts from below, and further reduce damage or the like to the undercover 90.

The rear cover 94 may be provided with a water drainage groove in its upper surface.

There may be a structure in which the pawls 228a, 228b are provided in the front end region of the cover main body 178 of the front cover 92 as shown in FIG. 23, and pawls 230a, 230b are provided in a rear end region of the cover main body 202 of the rear cover 94 as shown in FIG. 24. In this case, the pawls 188a through 188d of the rear end region of the front cover 92 and the pawls 218a through 218c of the front end region of the rear cover 94 are engaged with the cross member 56; and thereafter, the pawls 228a, 228b of the front end region of the front cover 92 are engaged with the cross member 54 and the pawls 230a, 230b of the rear end region of the rear cover 94 are engaged with the cross member 58. With this structure, the steps of fixing the front cover 92 and the rear cover 94 to the frame 16 with the fasteners are easy.

In the preferred embodiments described above, description was made of a golf car. However, the present invention is not limited to this. Preferred embodiments of the present invention are applicable to any other vehicle.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle comprising:
a frame including a pair of main frames spaced apart from each other in a vehicle width direction and extending in a vehicle fore-aft direction, and first, second, and third cross members each extending in the vehicle width direction joining the pair of main frames to each other;
an undercover supported by the frame and including a front cover and a rear cover respectively provided on a forward side and a rearward side of the undercover;
an engine room including an underside defined by the undercover; and
an engine housed in the engine room; wherein
the first, the second, and the third cross members are spaced apart from each other in the vehicle fore-aft direction and disposed in this order from a front to a rear of the vehicle; and
a rear end region of the front cover and a front end region of the rear cover are respectively engaged with the second cross member such that the rear end region of the front cover and the front end region of the rear cover are upwardly movable with respect to the second cross member when the front cover is fixed to at least one of the first cross member and the pair of main frames and the rear cover is fixed to at least one of the third cross member and the pair of main frames.

2. The vehicle according to claim 1, wherein the front cover includes a water drainage hole, and the rear cover includes a water drainage hole.

3. The vehicle according to claim 1, wherein the front cover also defines the underside of the engine room.

4. The vehicle according to claim 1, wherein the engine room further houses:
a muffler to which exhaust gas from the engine is supplied;
a muffler cover that covers the muffler; and
an exhaust duct connected to an exit end portion of the muffler cover; and
the front cover includes an opening to which the exhaust duct is attached.

5. The vehicle according to claim 4, wherein the opening is located at a more rearward position than a center of the front cover in the fore-aft direction.

6. The vehicle according to claim 4, wherein the opening is located at a more rearward position than the muffler cover in a side view of the vehicle.

7. The vehicle according to claim 1, further comprising:
a fastener that fixes the front cover to at least one of the first cross member and the pair of main frames; and
a fastener that fixes the rear cover to at least one of the third cross member and the pair of main frames; wherein
the rear end region of the front cover and the front end region of the rear cover include pawls that are engaged with the second cross member.

8. The vehicle according to claim 7, wherein the front end region of the front cover and the rear end region of the rear cover include pawls that are respectively engaged with the first cross member and the third cross member.

9. The vehicle according to claim 1, wherein the rear end region of the front cover and the front end region of the rear cover are respectively engaged with the second cross member so as to be upwardly pivotable with respect to the second cross member.

* * * * *